United States Patent
Greene et al.

(10) Patent No.: US 7,110,621 B1
(45) Date of Patent: Sep. 19, 2006

(54) ASSIST CHANNEL CODING USING A REWRITE MODEL

(75) Inventors: Daniel H. Greene, Sunnyvale, CA (US); Ashok C.. Popat, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/574,406

(22) Filed: May 19, 2000

(51) Int. Cl.
*G06K 9/03* (2006.01)

(52) U.S. Cl. .................................................. 382/310

(58) Field of Classification Search ................ 382/310, 382/209, 215, 217, 218, 309
See application file for complete search history.

(56) References Cited

U.S. PATENT DOCUMENTS

| | | | |
|---|---|---|---|
| 4,105,997 A | 8/1978 | McGinn | 340/146.3 |
| 4,728,984 A | 3/1988 | Daniele | 355/6 |
| 5,067,166 A * | 11/1991 | Ito | 382/215 |
| 5,321,773 A | 6/1994 | Kopec et al. | 382/30 |
| 5,486,686 A | 1/1996 | Zdybel, Jr. et al. | 235/375 |
| 5,526,444 A | 6/1996 | Kopec et al. | 382/233 |
| 5,594,809 A | 1/1997 | Kopec et al. | 382/161 |
| 5,625,721 A | 4/1997 | Lopresti et al. | 382/309 |
| 5,689,620 A | 11/1997 | Kopec et al. | 395/20 |
| 5,748,807 A | 5/1998 | Lopresti et al. | 382/310 |
| 5,883,986 A * | 3/1999 | Kopec et al. | 382/310 |
| 5,889,897 A * | 3/1999 | Medina | 382/310 |
| 5,956,419 A * | 9/1999 | Kopec et al. | 382/159 |
| 6,023,536 A * | 2/2000 | Visser | 382/310 |
| 6,047,093 A | 4/2000 | Lopresti et al. | 382/310 |
| 6,219,449 B1 * | 4/2001 | Nagaishi | 382/186 |

OTHER PUBLICATIONS

Costello et al. "Applications of Error-Control Coding," IEEE Transactions on Information Theory, vol. 44, No. 6, Oct. 1998, pp. 2531-2560.

Dobrushin "Shannon's Theorems for Channels with Synchronization Errors," (Translated from Problemy Peradachi Informatsii, vol. 3, No. 4, pp. 18-36, 1967) UDC 621.391.13, pp. 11-26.

Electronic Frontier Foundation Cracking DES: Secrets of Encryption Research, Wiretap Politics, and Chip Design, Distributed by O'Reilly & Associates, May 1998, pp. 4-1 to 4-14.

Hagenauer "Rate-Compatible Punctured Convolutional Codes (RCPC Codes) and Their Applications," IEEE Transactions on Communications, vol. 36, No. 4, Apr. 1998, pp. 389-400.

Jelinek "Fast Sequential Decoding Algorithm Using a Stack,"IBM Journal of Research and Development, vol. 13, Nov. 1969, pp. 675-685.

Jones et al. "Integrating Multiple Knowledge Sources in a Bayesian OCR Post-Processor," Proceedings of ICDAR 91, Saint-Malo, France; vol. 2, pp. 925-933.

Kam et al. "Document image Decoding by Heuristic Search," IEEE Transactions on Pattern Analysis and Machine Intelligence, vol. 18, No. 9, Sep. 1996, pp. 945-950.

(Continued)

*Primary Examiner*—Vikkram Bali
*Assistant Examiner*—Colin LaRose

(57) ABSTRACT

A system encodes a separate assist channel that carries only a small amount of additional information in a hardcopy document to compensate for failure of an OCR system to accurately reconstruct a scanned electronic version of the hardcopy document. After the OCR system produces an interpretation of the scanned electronic version of the hardcopy document, a rewrite system that is guided by the assist channel operates independent from the OCR system to correct decoding errors produced by the OCR system.

18 Claims, 32 Drawing Sheets

OTHER PUBLICATIONS

Kopec et al. "Document Image Decoding Using Markov Source Models," IEEE Transactions on Pattern Analysis and Machine Intelligence, vol. 16, No. 6, Jun. 1994, pp. 602-617.

Kopec "Multilevel Character Templates for Document Image Decoding," Proceedings of Document Recognition IV, San Jose, California; Feb. 12-13, 1997, SPIE vol. 3027, pp. 168-177.

LEE Convolutional Coding: Fundamentals and Applications, Artech House, Boston, 1997, pp. 101-116 and pp. 225-244.

Loprestri et al. "Certifiable Optical Character Recognition," IEEE Proceedings of the 2nd International Conference on Cocument Analysis and Recognition, pp. 432-435.

Peterson et al. Error-Correcting Codes, Second Edition, The Massachusetts Institute of Technology, 1972, pp. 269-309.

Schlegel Trellis Coding, IEEE Press, New York, 1997, pp. 43-89 and 233-262.

Schulman "Asymptotically Good Codes Correcting Insertions, Deletions, and Transpositions," IEEE Transactions on Information Theory, vol. 45. No. 7, Nov. 1999, pp. 2552-2557.

Stambler "Memoryless Channels with Synchronization Errors: The General Case," (Translated from Problemy Peredachi Informatsii, vol. 6, No. 3, pp. 43-49, Jul.-Sep., 1970) UDC 621.391.1, pp. 223-237.

Ullman "On the Capabilities of Codes to Correct Synchronization Errors," IEEE Transactions on Information Theory, vol. IT-13, No. 1, Jan. 1967, pp. 95-105.

Witten et al. Arithmetic Coding for Data Compression, Comm. ACM vol. 30, No. 6, 1987. pp. 520-540.

\* cited by examiner

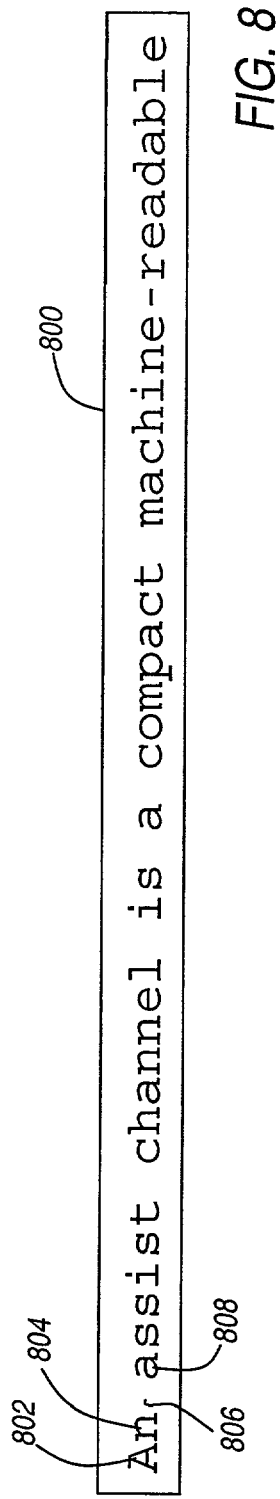
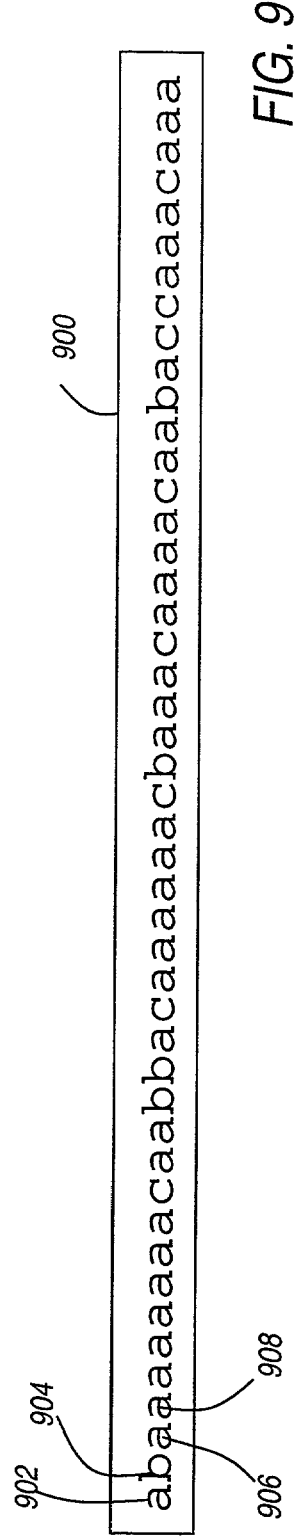
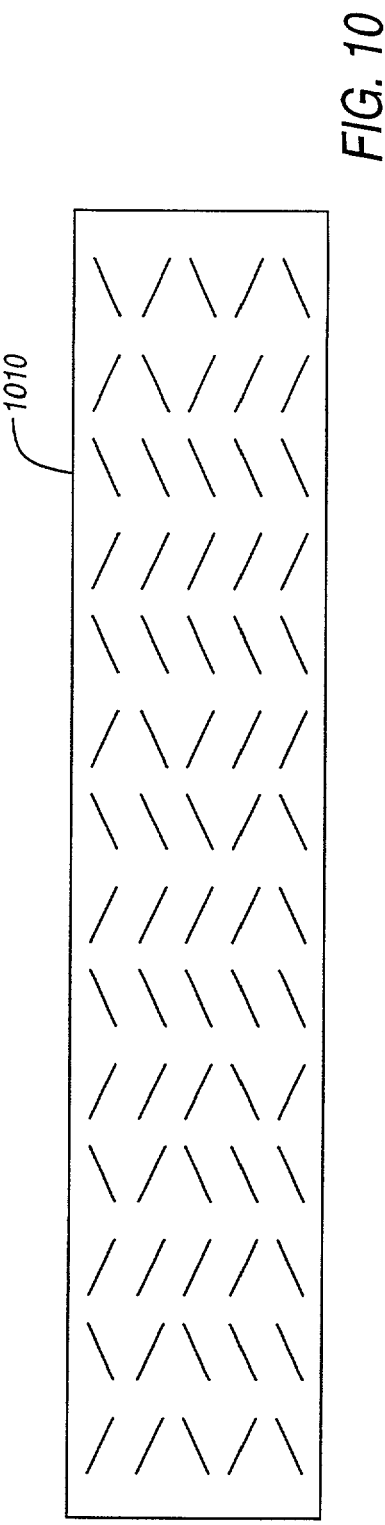
FIG. 8
FIG. 9
FIG. 10

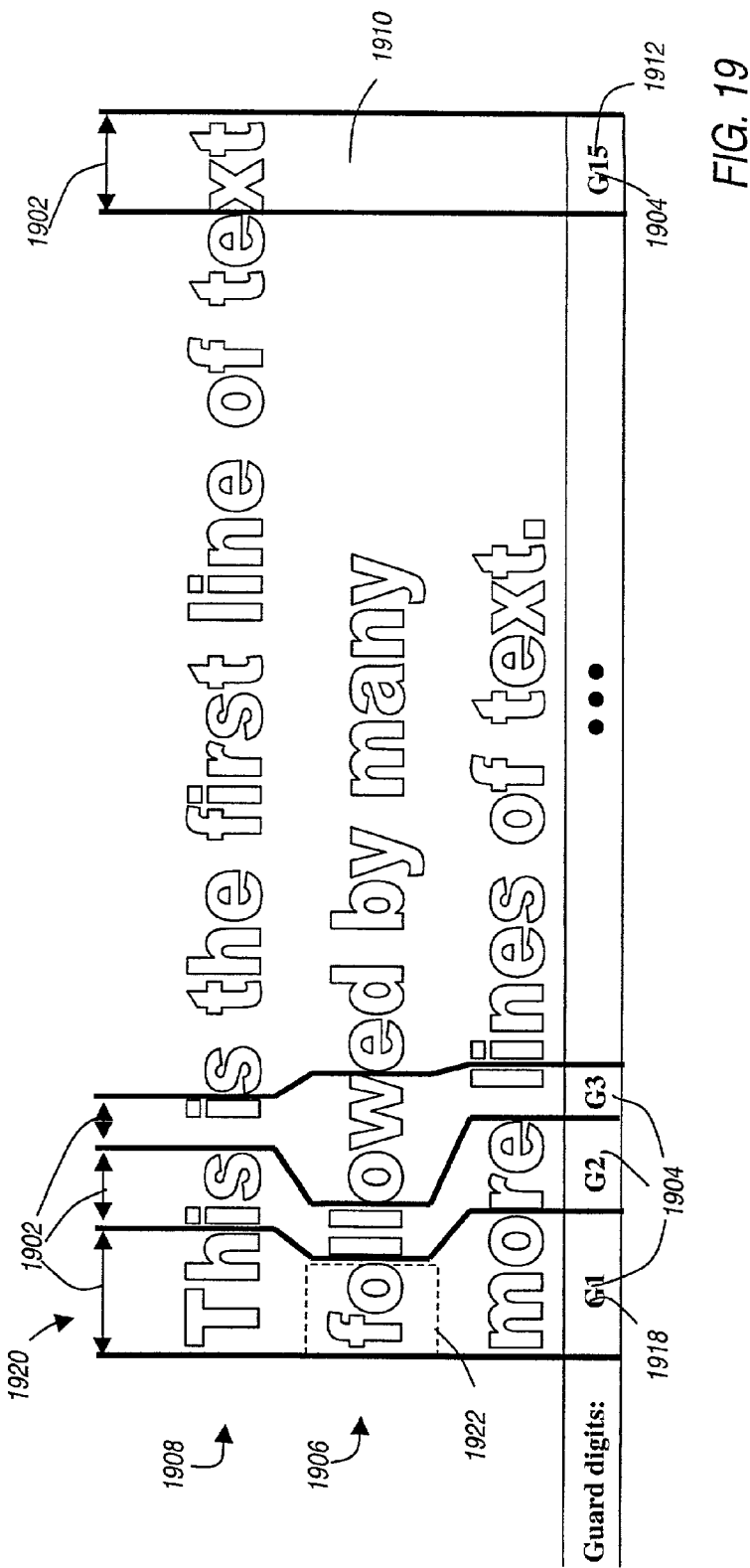

ASSIST CHANNEL CODING USING A REWRITE MODEL

CROSS-REFERENCE TO RELATED APPLICATIONS

Cross-reference is made to U.S. patent application Ser. No. 09/574,268, entitled "Assist Channel Coding With Character Classifications", Ser. No. 09/574,270, entitled "Assist Channel Coding With Vertical Block Error Correction", and Ser. No. 09/574,274, entitled "Assist Channel Coding With Convolution Coding", which are hereby incorporated by reference.

BACKGROUND OF THE INVENTION

1. Field of the Invention

The present invention relates generally to document image encoding and decoding, and more particularly, to a method and apparatus for improving accuracy of optical character recognition (OCR).

2. Description of Related Art

Input scanners have been developed for uploading hardcopy documents into electronic document processing systems. These scanners typically convert the appearance of a hardcopy document into a raster formatted, digital data stream, thereby providing a bitmapped representation of the hardcopy document appearance. OCR systems such as Textbridge produced by ScanSoft, Inc. convert bitmapped document appearances into corresponding symbolic encodings. Unfortunately, OCR systems are not immune to making errors when inferring a correlation between a particular bitmap pattern and a corresponding document encoding (e.g., ASCII).

This problem has been address by designing special fonts such as OCR-B fonts, where characters that are likely to be confused (e.g., 1, l, and I) are given distinctly different typographic features. This allows an OCR system to more accurately infer the correlation between a bitmap pattern and its corresponding document encoding. In addition, Plumb et al. disclose in "Tools for Publishing Source Code via OCR," 1997, printing the primary channel of a hardcopy document by replacing spaces and tabs with printable characters. Also, U.S. Pat. No. 4,105,997 discloses a method for using checksums of text in a document to locate errors during OCR.

This problem has also been addressed in U.S. Pat. No. 5,486,686, which discloses a document processing system in which human readable hardcopy renderings of a document are integrated with complete or partial electronic representations of the document and/or its content. The electronic representation provides an "assist channel" that encodes information about the document or computed from the document. The assist channel is defined using printable machine-readable codes. In one illustrated example, the assist channel can be defined using compact glyph codes at the bottom of a document.

More specifically, an "assist channel" of a hardcopy document is a machine readable encoding of side information that aids an OCR application in decoding the contents of a primary channel. The "primary channel" of a hardcopy document includes the human readable information of document. The primary channel, which cannot be modified and is slightly error prone to OCR processing, carries most of the information content of the document. One use of the assist channel is to encode information that assists in the identification of failures of an OCR application in decoding the contents of a primary channel as disclosed for example in U.S. Pat. Nos. 5,625,721; 5,748,807; and 6,047,093.

Even with these advances that improve OCR processing using an assist channel, it continues to be desirable to provide an assist channel encoding that balances and improves the tradeoff between the amount of information encoded in the assist channel and the improved accuracy of the OCR system given the encoded information. At one extreme, the assist channel can contain as much information as the primary channel (i.e., redundant information). At the other extreme, the assist channel can simply contain a single checksum of the contents of a document. There exists therefore the desirability to provide an assist channel encoding that compensates for the failure of the primary channel during OCR processing yet is compact relative to the primary channel.

SUMMARY OF THE INVENTION

In accordance with the invention, there is provided a method, and apparatus therefor, for generating image data for rendering on a hardcopy document. A primary set of symbol data is identified that provides a first channel of human readable information to be rendered on the hardcopy document. A secondary set of encoding data is computed from the primary set of symbol data. The secondary set of encoding data provides an assist channel of machine readable information that is rendered on the hardcopy document.

In accordance with one aspect of the invention, the image data of the hardcopy document is decoded by recording a scanned representation of the hardcopy document that includes the primary set of symbol data and the secondary set of encoding data. The scanned representation of the hardcopy document is decoded using any OCR engine to define a candidate set of symbol data. Independent of the OCR engine, the candidate set of symbol data is rewritten using an event library and the secondary set of encoding data. The event library identifies likely failures encountered when the scanned representation of the hardcopy document is decoded.

BRIEF DESCRIPTION OF THE DRAWINGS

These and other aspects of the invention will become apparent from the following description read in conjunction with the accompanying drawings wherein the same reference numerals have been applied to like parts and in which:

FIG. 8 illustrates an example of a primary channel;

FIG. 9 illustrates an assist channel for the primary channel shown in FIG. 8 that is developed using the partition illustrated in FIG. 7;

FIG. 10 illustrates an example of an assist channel that is encoded using data glyphs;

FIG. 18 illustrates an example of a primary channel of data;

FIG. 19 illustrates an example in which guard digits are computed for specified vertical blocks of symbol data of the primary channel shown in FIG. 18;

DETAILED DESCRIPTION

A. Assist Channel Operating Environment

Figure 1:
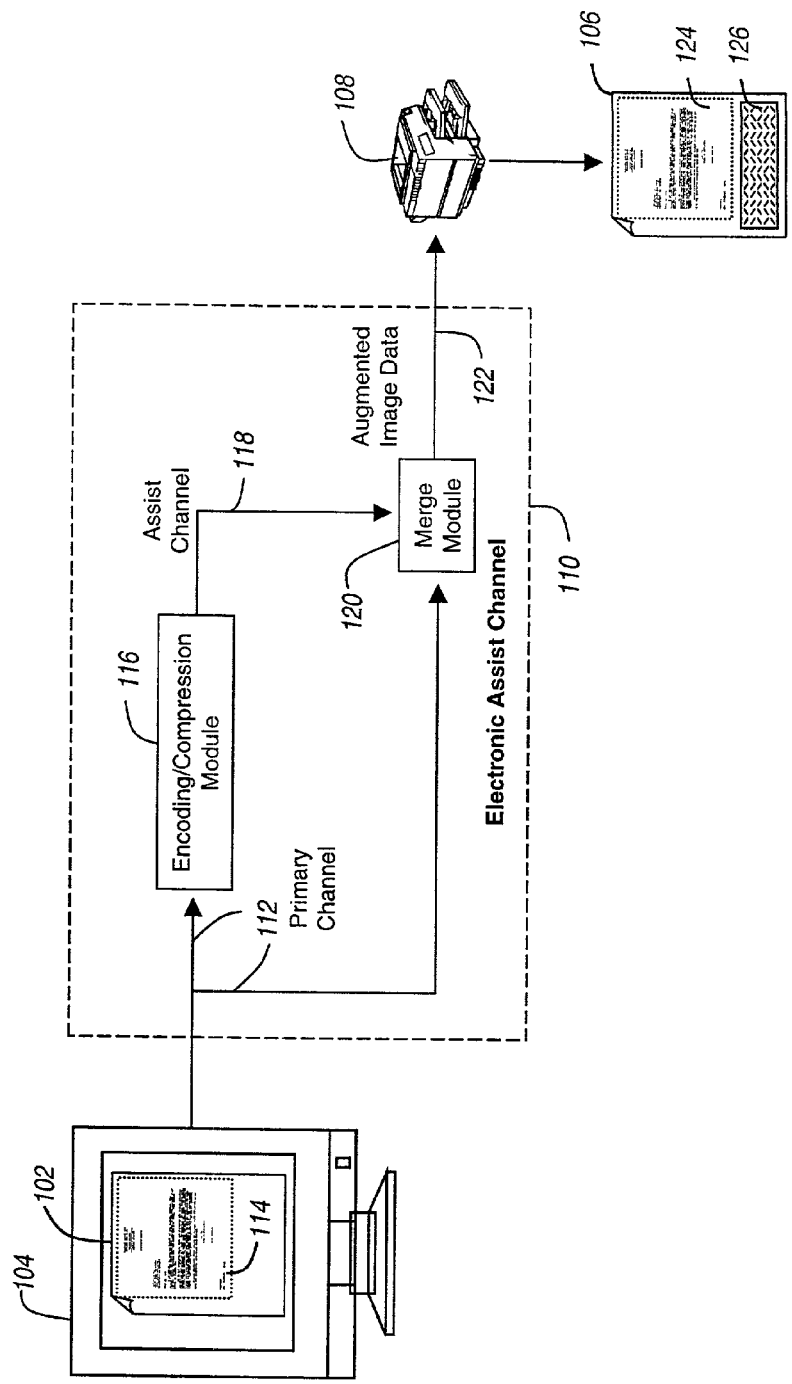
FIG. 1 illustrates the exchange of an electronic document that is viewed and/or created on a display.
Figure 2:
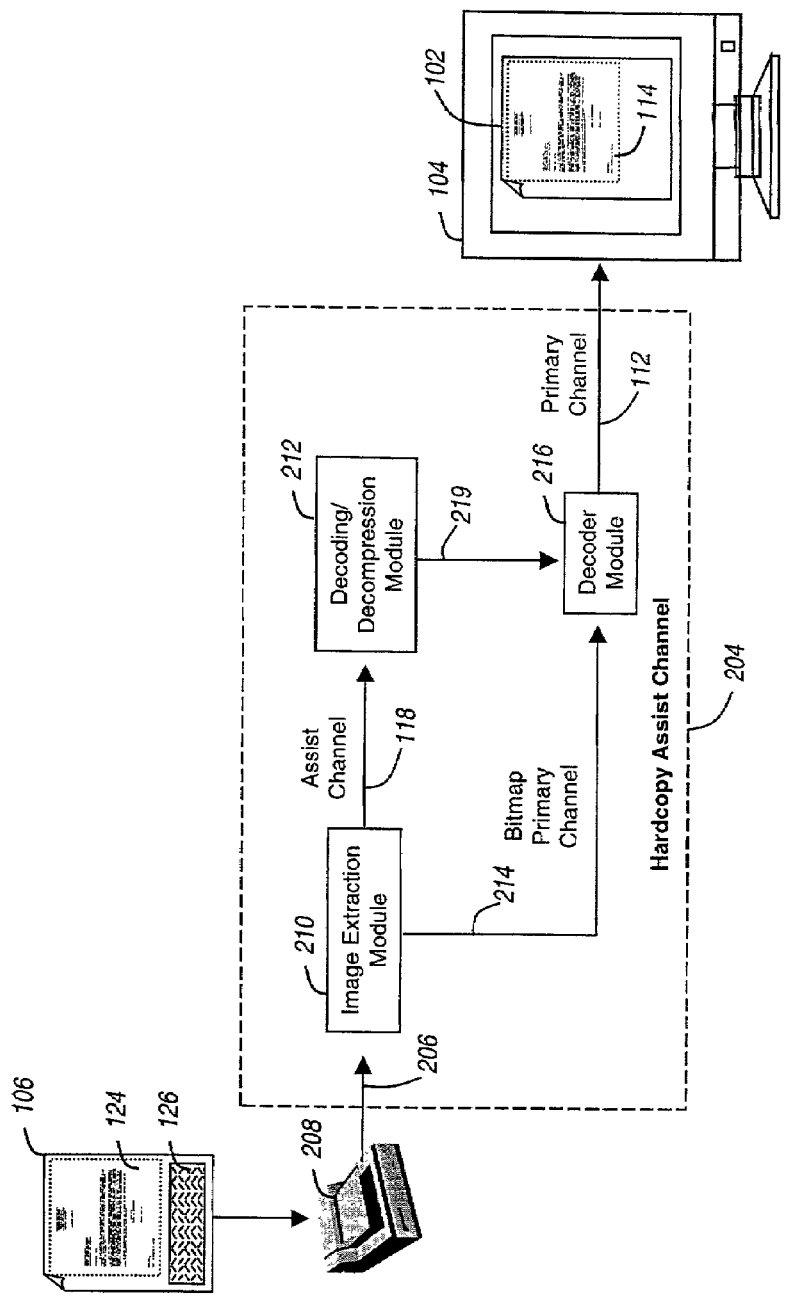
FIG. 2 illustrates the exchange of a hardcopy document, with data from a primary channel and an assist channel rendered thereon, between the hardcopy domain and the electronic domain.

FIGS. 1 and 2 illustrate the general operating environment of the present invention, in which documents are exchanged between the electronic and the hardcopy domain. FIG. 1 illustrates an electronic document 102 that is viewed and/or created on a display 104, or the like, and a hardcopy document 106 that is rendered on a physical medium such as paper by a printer 108. An electronic assist channel 110 receives image data from an electronic document processing system (not shown) that is used for creating and/or editing the electronic document 102 and produces as output augmented image data 122.

The image data input to the electronic assist channel 110 is defined herein as primary channel 112 data that includes the image data 114 of the electronic document 102. An encoding/compression module 116 of the electronic assist channel 110 produces an assist channel 118. A merge module 120 of the electronic assist channel 110 merges the primary channel 112 with the assist channel 118 to produce the augmented image data 122. In this embodiment shown in FIG. 1, the primary channel 112 and the assist channel 118 of the augmented image data 122 is rendered on the hardcopy document 106 at 124 and 126, respectively. The primary channel data 124 is optimized to be human readable information, whereas the assist channel data 126 is optimized to be machine readable information.

FIG. 2 illustrates the uploading of the hardcopy document 106, with data from a primary channel 124 and an assist channel 126 rendered thereon, from the hardcopy domain to the electronic domain. In accordance with one aspect of the invention, a hardcopy assist channel 204 receives bitmap image data 206 from scanner 208. An image extraction module 210 in the hardcopy assist channel 204 separates the assist channel 118 data from bitmap primary channel 214 data. A decoding/decompression module 212 in the hardcopy assist channel 204 prepares the assist channel 118 data for use by decoder module 216.

The decoder module 216 performs Optical Character Recognition (OCR) on the bitmap primary channel 214 using decoded and decompressed assist channel 219 to produce primary channel data 112. Once accurately reconstructed using the assist channel 118, the primary channel data 112 can be displayed on display 104 as image data 114. Accordingly, the assist channel modules 110 and 204 aid in performing OCR processing of hardcopy document image data that converts data between the hardcopy and electronic domains.

It will be appreciated by those skilled in the art that there exists multiple operating arrangements of the assist channel modules 110 and 204 shown in FIGS. 1 and 2. In some embodiments, the assist channel modules 110 and 204 are embedded in computer systems that operate integral with the display 104 or the printer 108, or that operate separate from the display 104 and printer 108. In other embodiments, the assist channel modules 110 and 204 operate integral with each other or separate from each other on one or more computer systems.

B. Assist Channel Coding

By way of overview, assist channel coding compresses information content of a primary channel in the assist channel with only that information that may be missing or needed during OCR processing of the primary channel. That is, unlike techniques that can be used to compress a duplicate primary channel, the assist channel improves encoding efficiency by minimizing the content of the assist channel. Also, unlike progressive encoding (or pyramid encoding), where the primary and secondary channels are designed to deliver information progressively, assist channel coding begins with a fixed channel of data and augments that data with data that compensates for errors or omissions encountered when converting from the hardcopy domain to the electronic domain.

Disclosed below in sections C, D, and E are three different methods for encoding and decoding assist channel data. By way of overview, FIGS. 3–16 illustrate assist channel coding/decoding using separation coding; FIGS. 17–22 illustrate assist channel coding/decoding using block coding; and FIGS. 23–28 illustrate assist channel coding/decoding using convolution coding. Section F describes an alternate operating environment which uses a "rewrite model" in which these decoding techniques can be applied.

C. Assist Channel Separation Coding

A first method of assist channel coding, referred to herein as "separation coding", classifies the symbols in primary channel that are most likely to be confused during OCR processing into different groups (i.e., equivalence classes). Advantageously, classifications of characters into equivalence classes, which may be readily compressed, are encoded in the assist channel and not the actual character codes, which may not be compressed as well. When decoding a scanned representation of the primary channel, the allowable symbol matches from a template library are restricted during OCR to those that satisfy the classifications encoded in the assist channel, thereby improving OCR reliability.

C.1 Assist Channel Separation Encoding

Figure 3:
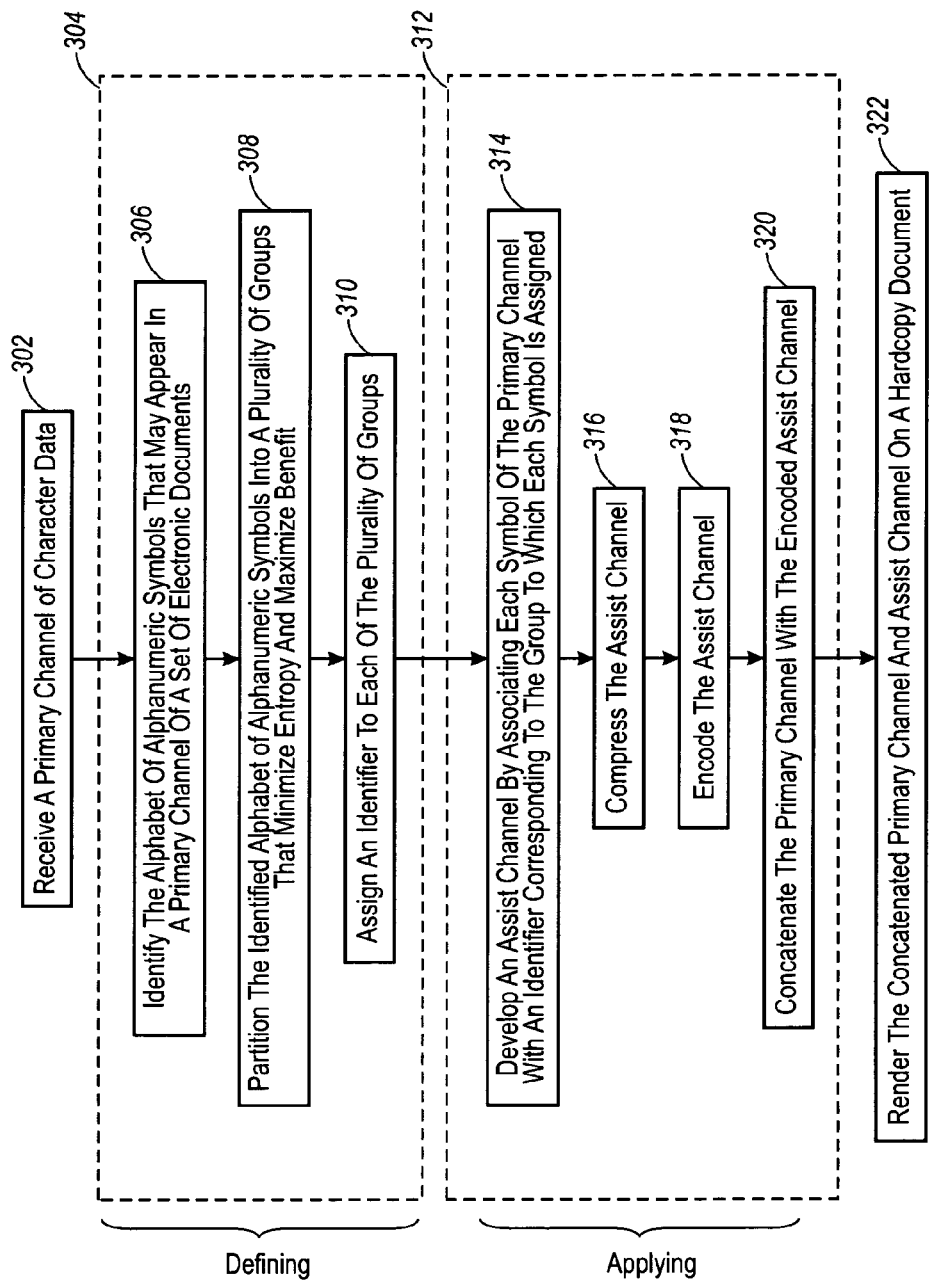
FIG. 3 is a flow diagram of the general steps for carrying out separation encoding in accordance with the present invention.

FIG. 3 is a flow diagram of the general steps for carrying out separation encoding. Generally, separation coding can be divided into two distinct operations: defining an encoding and applying the encoding. Operations for defining an encoding, which are identified by the block of steps 304, involve the generation of a collection of equivalence classes that separate the characters or symbols in the primary channel that are most likely to be confused during OCR processing. Operations, which are identified by the block of steps 312, for applying the encoding developed at steps 304, involve assigning characters or symbols in the primary channel to an equivalence class from the collection of defined equivalence classes.

By way of overview, the operations for defining an encoding at steps 304 may be performed with, or independent from, the operations for applying the encoding at steps 312. In fact, steps 304 need only be performed once for any number of times an assist channel is created for a particular primary channel, while steps 312 are required to be performed each time an assist channel is created for a primary channel. As will be discussed in greater detail below, an encoding need not be defined each time it is applied at steps 312.

More specifically at step 306, an alphabet of (alphanumeric) symbols (i.e., symbol data) that may appear in a primary channel of a set of electronic documents is identified. Subsequently at step 308, the identified alphabet of symbols is partitioned into a plurality of groups that minimize entropy and maximize benefit. That is at step 308, the alphabet of symbols is mapped to one of a plurality of equivalence classes (i.e., groups) in a manner that (a) minimizes the amount of information that makes up the assist channel (i.e., entropy) and (b) that maximizes the probability that two characters, which are likely to be confused during OCR processing, are placed in different equivalence classes (i.e., benefit).

Figure 4:
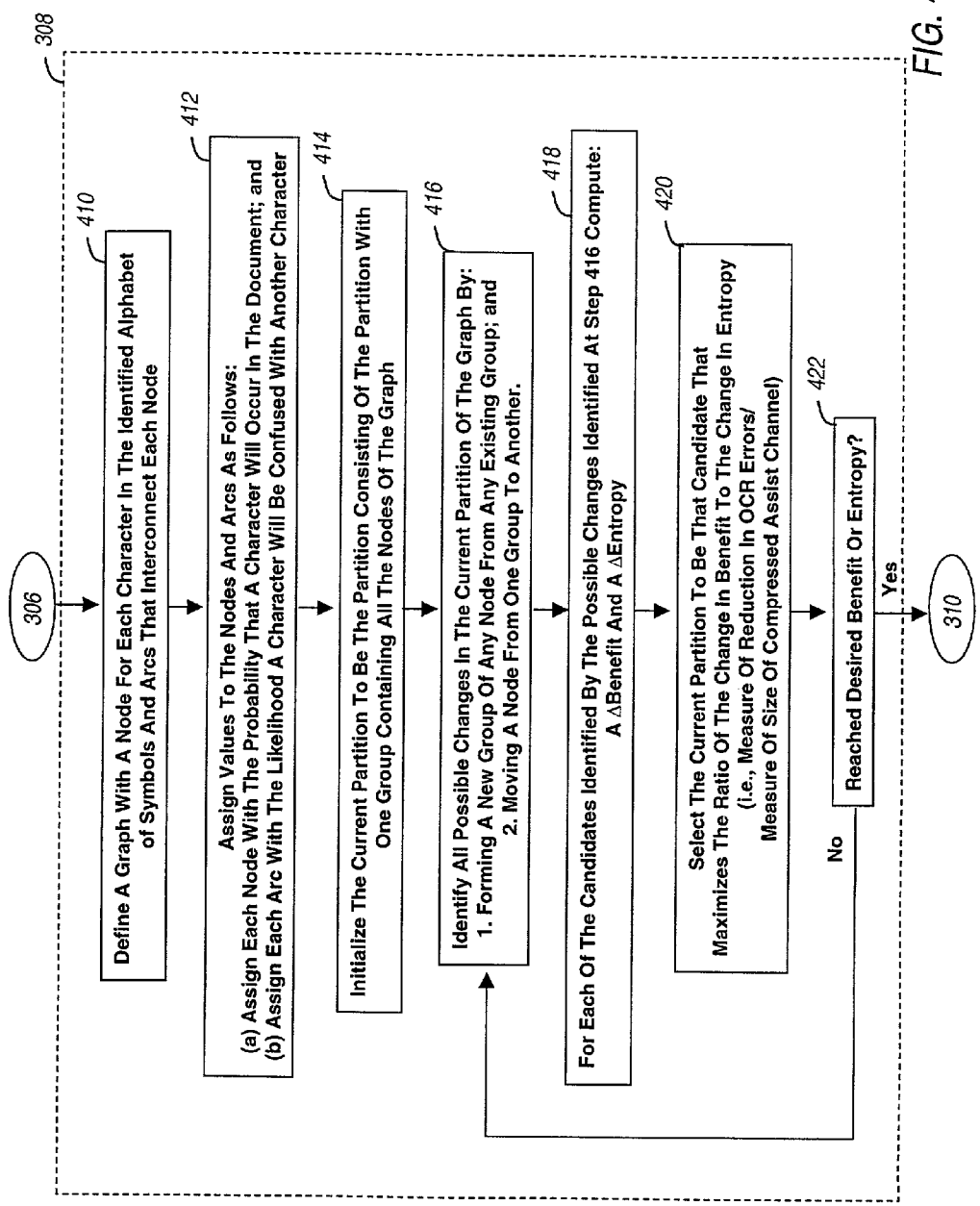
FIG. 4 is a flow diagram that sets forth step 308 shown in FIG. 3 in greater detail.
Figure 5:
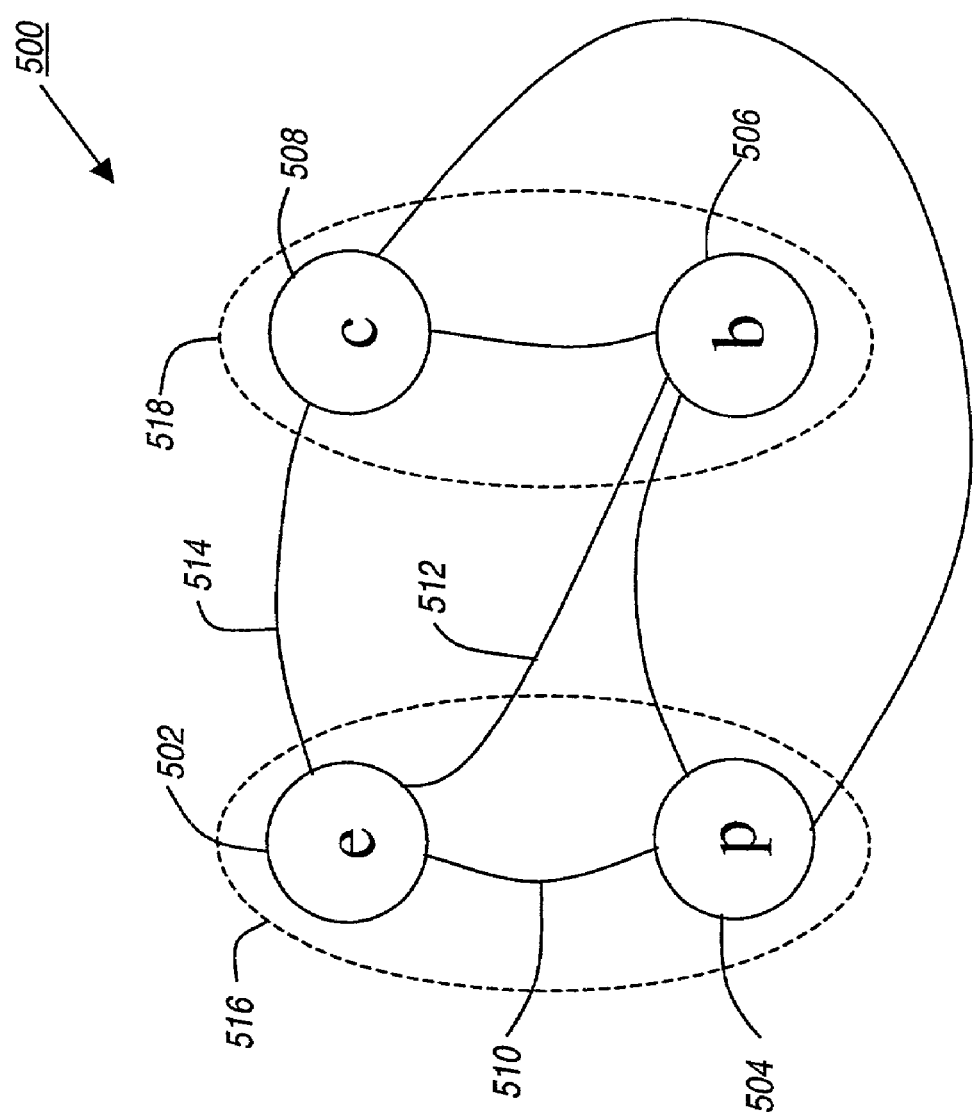
FIG. 5 illustrates an example of a graph of an identified alphabet of four symbols "e", "p", "b", and "c" with corresponding nodes that record the probability that a character will occur.

FIG. 4 is a flow diagram that sets forth step 308 shown in FIG. 3 for partitioning the identified alphabet of alphanumeric symbols into a plurality of groups in greater detail. At step 410, a graph is defined that includes a node that corresponds to each character in the identified alphabet of symbols and arcs that interconnect each node. FIG. 5 illustrates an example of a graph 500 of an identified alphabet of four symbols "e", "p", "b", and "c" with corresponding nodes 502, 504, 506, and 508, respectively, that record the probability that a character will occur. Each node has an arc to another node that records the benefit of one character being separated from the other character. For example, node 502 has arcs 510, 512, and 514 to nodes 504, 506, and 508, respectively, that record that benefit that each is separated from the other into different equivalence classes.

At step 412 in FIG. 4, the nodes and arcs defined at step 410 are assigned values. More specifically, each node is assigned a value defined by the probability that a character will occur in a document. Each arc is assigned a value that is defined by the likelihood that the characters at the ends of the arc will be confused during OCR processing. At step 414, all the nodes are assembled in a single group to define a current partition of the nodes. The current partition is adjusted at steps 416, 418, 420, and 422 in a manner that minimizes entropy and maximizes benefit.

At step 416, all possible changes in the current partition of the graph are identified. In one embodiment, possible changes are identified by (a) forming a new group of any node from any existing group; and (b) moving a node from one group to another group. At step 418, for each of the possible candidates identified at step 416, the change in benefit and change in entropy are computed. Each candidate includes one or more possible changes that define a new partition. At step 420, the current partition is selected to be that partition that maximizes the ratio of change in benefit to the change in entropy.

More specifically at step 420, the current partition is selected from those candidates defined by the changes identified at step 416 so that the ratio of the reduction in OCR errors to the size of the information content of the assist channel is maximized. Referring again to FIG. 5, the current partition of the graph 500 includes groups 516 and 518. At step 422, if the desired benefit or entropy is achieved then the routine terminates with the current partition being the partition of the identified alphabet of symbols that minimizes entropy and maximizes benefit at step 308.

Figure 6:
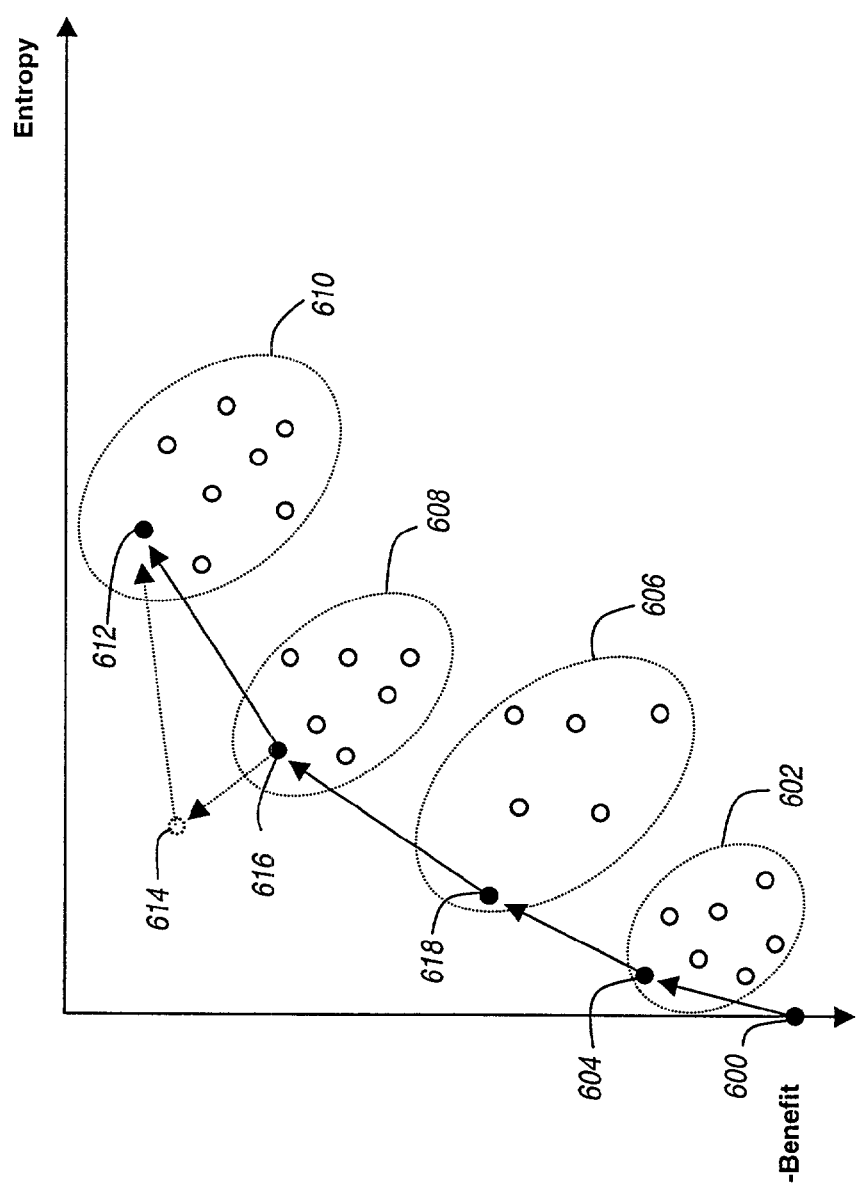
FIG. 6 is a graph that illustrates the iterative process for identifying a current partition which minimizes entropy while maximizing benefit.

FIG. 6 is a graph that illustrates the iterative process for identifying the current partition that minimizes entropy while maximizing benefit. Initially, the current partition is represented by point 600 on the graph (step 414). After a first set of candidates 602 are identified (step 418), the candidate 604 that maximizes the entropy to benefit ratio is selected (step 420). This process continues iteratively for candidates 606, 608, and 610, until candidate 612 is identified with the desired benefit or entropy (step 422). It will be appreciated by those skilled in the art that this process will take into account the instances when a candidate, such as hypothetical candidate 614, results in a ratio that is locally negative relative to the prior current partition 616. In the example shown in FIG. 6, choosing such a candidate would therefore be preferred over choosing any of the candidates 608 with positive slopes.

Figure 7:
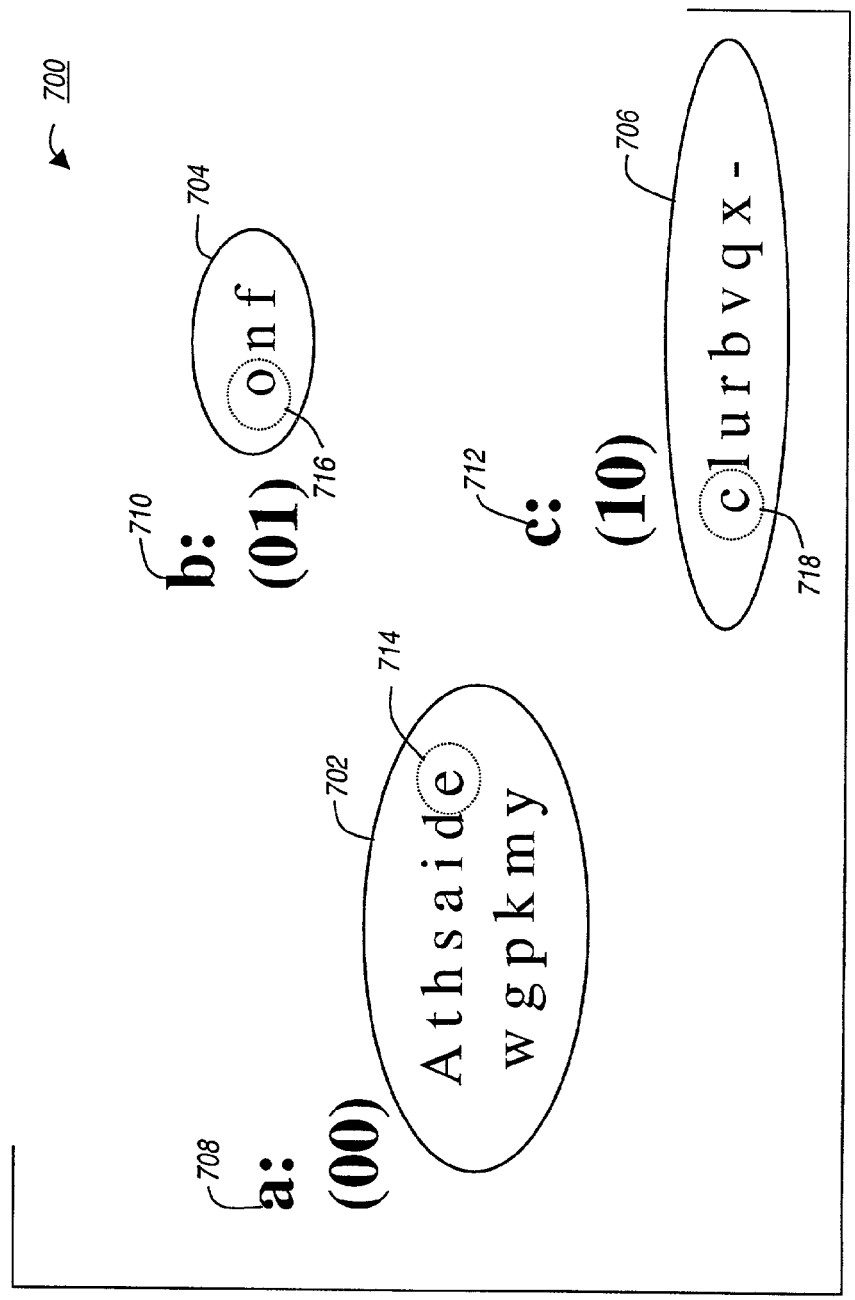
FIG. 7 illustrates a partition in which a set of symbols is arranged into three groups.

Referring again to FIG. 3, step 310 is executed once the identified alphabet of alphanumeric symbols is partitioned into groups that minimizes entropy while maximizing benefit at step 308. At step 310, an identifier is assigned to each of the plurality of groups of the partition developed at step 308. FIG. 7 illustrates a partition 700 in which a set of symbols is arranged into three groups 702, 704, and 706 (step 308). The groups 702, 704, and 706 are assigned the identifiers 708, 710, and 712, respectively (step 310). The partition 700 maximize benefit by separating the symbols "e", "o", and "c" identified by reference numbers 714, 716, and 718, which are likely to be confused by an OCR process, into groups 702, 704, and 706, respectively. In addition, the partition 700 minimizes entropy by defining three groups that assemble in the largest group 702 those symbols that have the greatest probability of occurring in a document.

An example of a partition of the ASCII character set is set forth in Table 1 into which the ASCII character set is divided into nine groups of characters. As set forth above, the characters that are easily confused during OCR processing, "e", "c", and "o" are separated into groups or classes with identifiers (i.e., IDs) Z1, Z2, and Z4, respectively, to maximize benefit. In addition, the characters most likely to occur in the first and largest group identified as Z1 minimize entropy, thereby minimizing the amount of information content in the assist channel.

TABLE 1

| ID | Symbol Group |
|---|---|
| Z1 | space, %, @, A, B, D, F, G, H, K, M, N, O, P, S, T, W, a, d, e, g, h, i, k, m, n, , s, t, u, w, x, y |
| Z2 | $, &, „ 6, 8, ?, C, E, L, R, U, V, X, Y, b, c, f, j, l, p, q, v, z |
| Z3 | !, *, 7, ;, <, =, >, \, ^, ´, _ |
| Z4 | #, ., 0, 3, 5, 9, l, Q, o |
| Z5 | (, ), -, 2, 4, :, J, Z |
| Z6 | ", /, 1, {, ¦, }, ~ |
| Z7 | +, ], ' |
| Z8 | ' |
| Z9 | [ |

Because the steps 304 examine only local changes at step 416, this technique for defining partitions will not always arrive at the global optimal tradeoff between benefit and entropy. While algorithmic techniques such as simulated annealing or branch and bound may be used to find better solutions, these approaches offer slightly improved solutions to the technique set forth at steps 304 but require considerably more time to find a solution. Consequently, the steps 304 are very well suited for this application for identifying graph partitions.

Once the defining steps 304 have completed, the applying steps 312 are performed. Initially at step 314, an assist channel is developed by associating each symbol of the primary channel received at step 302 with an identifier corresponding to the group in which each symbol is assigned. FIG. 8 illustrates an example of a primary channel 800 received at step 304. FIG. 9 illustrates an assist channel 900 for the primary channel shown in FIG. 8 that is developed using the partition 700 illustrated in FIG. 7. Specifically, the first two symbols "A" and "n" from the primary channel 800, identified by reference number 802 and 804, are classified in groups 702 and 704 with the identifiers 708 (i.e., "a") and 710 (i.e., "b"), which are identified by the reference numbers 902 and 904 in FIG. 9, respectively.

At step 316, the assist channel developed at step 314 is compressed using, for example, arithmetic encoding, Ziv-Lempel encoding, or run length encoding. These and other compression techniques are disclosed by Cover et al., in "Elements of Information Theory," John Wiley & Sons, Aug. 12, 1991 (ISBN: 0471062596), which is incorporated herein by reference. Once the assist channel is compressed at step 316, it is encoded at step 318. In one embodiment, the assist channel is encoded using data glyphs. FIG. 10 illustrates an example of an assist channel 1010 that is encoded using data glyphs.

Data glyphs referred to herein encode digital information in the form of binary ones and zeros that are then rendered in the form of very small linear marks. Generally, each small mark represents a digit of binary data. Whether the particular digit is a binary one or zero depends on the linear orientation of the particular mark. For example, in one embodiment, marks oriented from top left to bottom right may represent a zero, while marks oriented from bottom left to top right may represent a one.

The individual marks of data glyphs, which form the assist channel 126 shown in FIGS. 1 and 2, are of such a size relative to the maximum resolution of a printing device as to preferably produce an overall visual affect to a casual observer of a uniform gray halftone area when a large number of such marks are printed together on paper. U.S. Pat. Nos. 5,091,966, 5,128,525, 5,168,147, 5,221,833, 5,245,165, 5,315,098, 5,449,895, and 5,486,686, which are hereby incorporated by reference, provide additional information about the uses, encoding, and decoding techniques of data glyphs.

Referring again to FIG. 3, at step 320 encoded data glyphs are concatenated with the primary channel to produce augmented data. The concatenated channels (i.e., augmented data) are rendered on a hardcopy document. As shown in FIG. 1 in one embodiment, the augmented data 122 is rendered by printer 108 on hardcopy document 106 as primary channel 124 and assist channel 126.

It will be appreciated by those skilled in the art that the defining steps 304 need not be performed each time the applying steps 312 are performed for a primary channel received at step 302. Instead, defining steps 304 need only be performed once for any number of primary channels. Alternatively, defining steps 304 can be performed intermittently as the alphabet or font of the alphanumeric symbols received at step 302 changes.

In another embodiment, the defining steps 304 are performed once for different categories of documents, fonts, or machines. For example, the defining steps may be performed once for per font typeface and repeatedly applied at steps 312. Also by way of example, categories of documents may include categorization by the genre of document (e.g., office documents, legal documents, memos, images, etc.). Further by way of example, categories of machines include specific scanner and printers, or classes of scanners and printers. For example, the defining steps 304 in one embodiment may be performed for a specific scanner and/or printer, thereby sensitizing the encoding scheme to particular failures of the specific scanner and/or printer.

C.2 Assist Channel Separation Decoding

Figure 11:
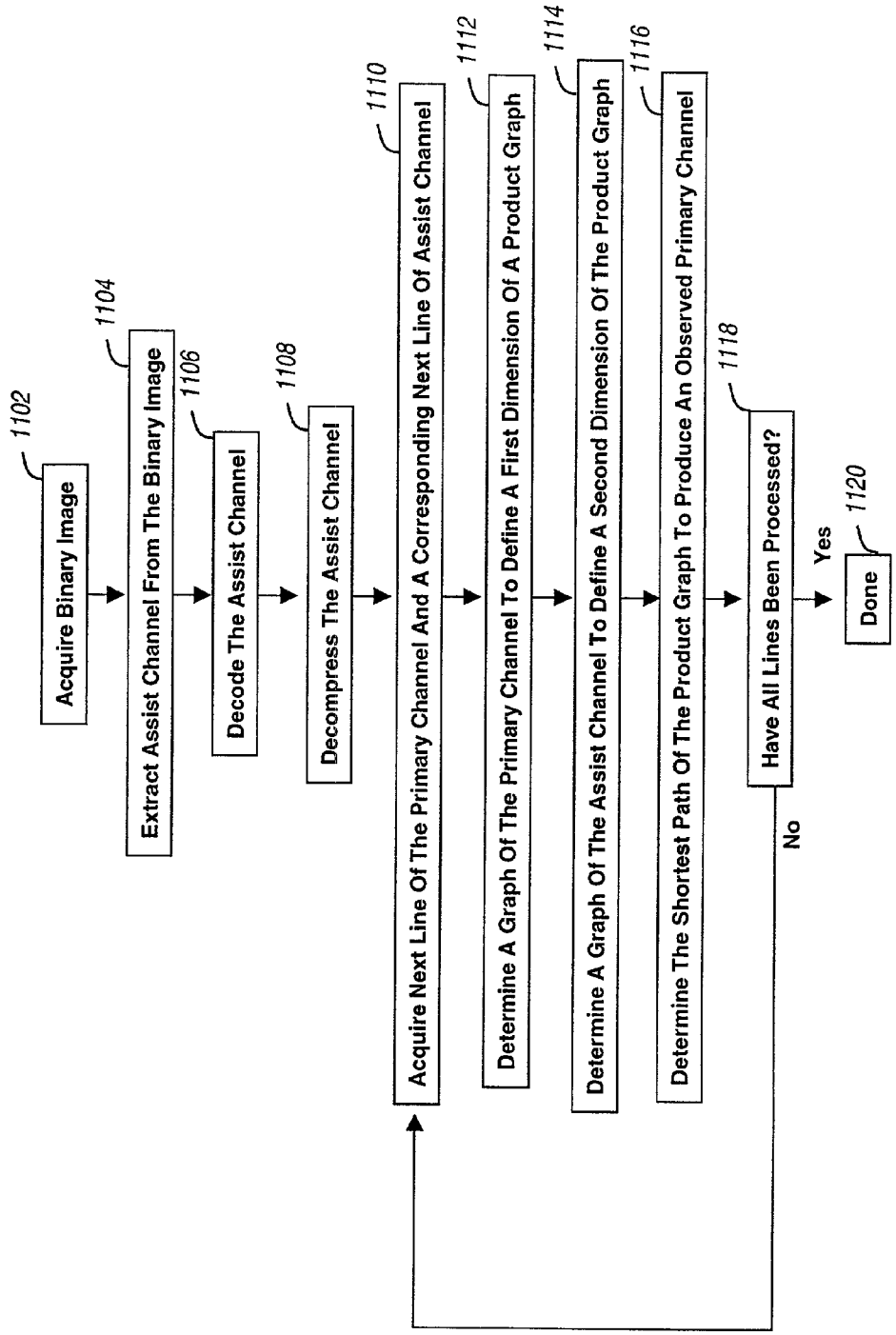
FIG. 11 illustrates a flow diagram of the steps performed by the hardcopy assist channel for decoding the primary channel of the hardcopy document augmented with the assist channel.

FIG. 11 illustrates a flow diagram of the steps performed by the hardcopy assist channel for decoding the primary channel 124 of the hardcopy document 106 augmented with the assist channel 126, which is shown in FIG. 2. Initially at step 1102, a bitmap image 206 of the hardcopy document 106 is acquired using, for example, scanner 208. At step 1104, the image extraction module 210 extracts the assist channel from the bitmap image 206 to provide the assist channel 118 to the decoding/decompression module 212. In addition, the image extraction module 210 extracts a bitmap primary channel 214, which is a bitmap representation of the primary channel 124, from the bitmap image 206.

At step 1106, the assist channel is decoded by module 212. For example, if the assist channel is encoded using data glyphs, those data glyphs are decoded at step 1106 to their digital representation. The assist channel (now in a digital form) is decompressed at step 1108 by module 212 to provide to the decoder module 216 a decoded and decompressed assist channel 219.

Beginning at step 1110, the decoder module 216 acquires as input successive lines of the bitmap primary channel 214 and corresponding successive lines of the decoded and decompressed assist channel 219 from modules 210 and 212, respectively. For each the successive lines of channels 214 and 219 received at step 1110, steps 1112, 1114, and 1116 are executed until all lines of the primary channel 214 have been processed at step 1118, at which point, decoding of the primary channel completes at step 1120. Once the decoder module 216 completes at step 1120, a decoded primary channel 112 can be viewed in electronic form on display 104 as 114 in document 102.

With specific reference now to steps 1112, 1114, and 1116 for decoding a line of the bitmap primary channel 214, at step 1112, a graph of the line of the primary channel is determined to define a first dimension of a product graph. At step 1114, a graph of the corresponding line of the assist channel is determined to define a second dimension of the product graph. Finally at step 1116, the shortest path of the product of the graph of the primary channel and the graph of the assist channel is determined to produce an observed primary channel.

In one embodiment, step 1112 (for each line of "text" of the bitmap primary channel 214) is performed by the decoder module 216 using a document decoding technique known in the art as Document Image Decoding (DID). In general, DID is accomplished using dynamic programming or the Viterbi algorithm. The dynamic programming involves the search for a path through a finite state network representing an observed image (i.e., primary channel 112) that is the most likely path that would produce the observed image (i.e., the most likely observed image that could have come from the bitmap primary channel 214).

Further details of dynamic programming are disclosed in "The Design and Analysis of Computer Algorithms" (Addison-Wesley Series in Computer Science and Information Processing) by Aho, Hopcroft, and Ullman, Addison-Wesley Pub Co., ISBN: 0201000296, June 1974, the pertinent portions of which are incorporated herein by reference. In addition, further details of DID are disclosed in U.S. Pat. Nos. 5,321,773; 5,526,444; 5,689,620; and 5,594,809; which are incorporated herein by reference, and in U.S. patent application Ser. Nos.: 09/570,730, entitled "Document Image Decoding Using An Integrated Stochastic Language Model"; Ser. No. 09/569,531, entitled "Dynamic Programming Operation With Skip Mode For Text Line Image Decoding"; and Ser. No. 09/570,004, entitled "Document Image Decoding Using Text Line Column-Based Heuristic Scoring"; which are also incorporated herein by reference.

Figure 12:
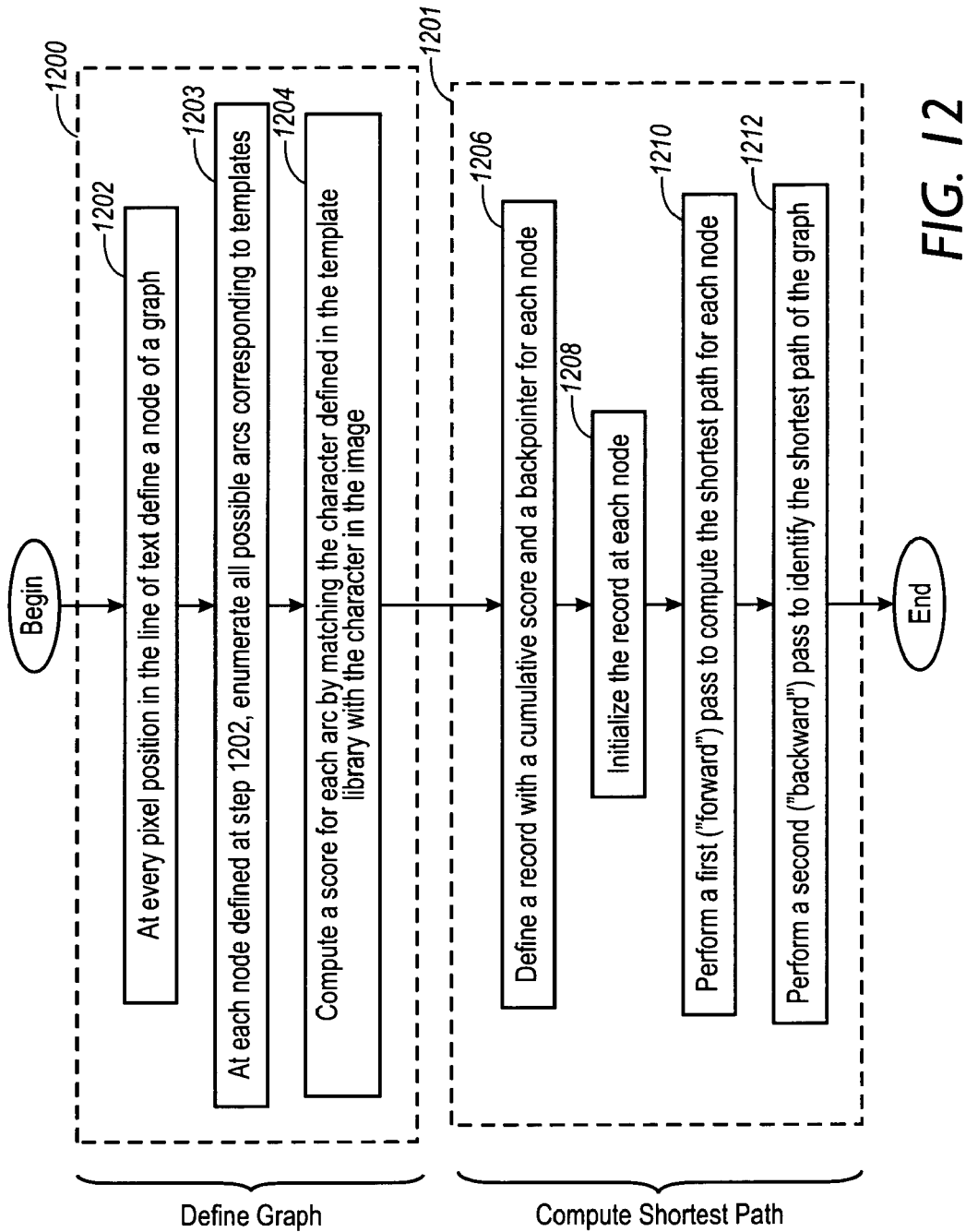
FIG. 12 is a flow diagram that sets forth the steps for computing the shortest path of a graph of a primary channel.

Referring now to FIG. 12, which is a flow diagram that sets forth the steps for computing the shortest path of a graph of a primary channel using a Viterbi algorithm. Initially, a graph is defined at steps 1200 and a shortest path of the defined graph is computed at steps 1201. FIG. 12 describes a DID decoder that operates without the assistance of an assist channel. To include an assist channel, the graph defined in steps 1200 is modified by computing a product graph before the shortest path is computed. Referring now to the steps in FIG. 11, the steps 1200 are performed at step 1112 to determine a graph for the primary channel. In addition, the steps 1201 are performed at step 1116 to determine the shortest path of a graph defining the product of the graphs of the primary and assist channels.

Figure 13:
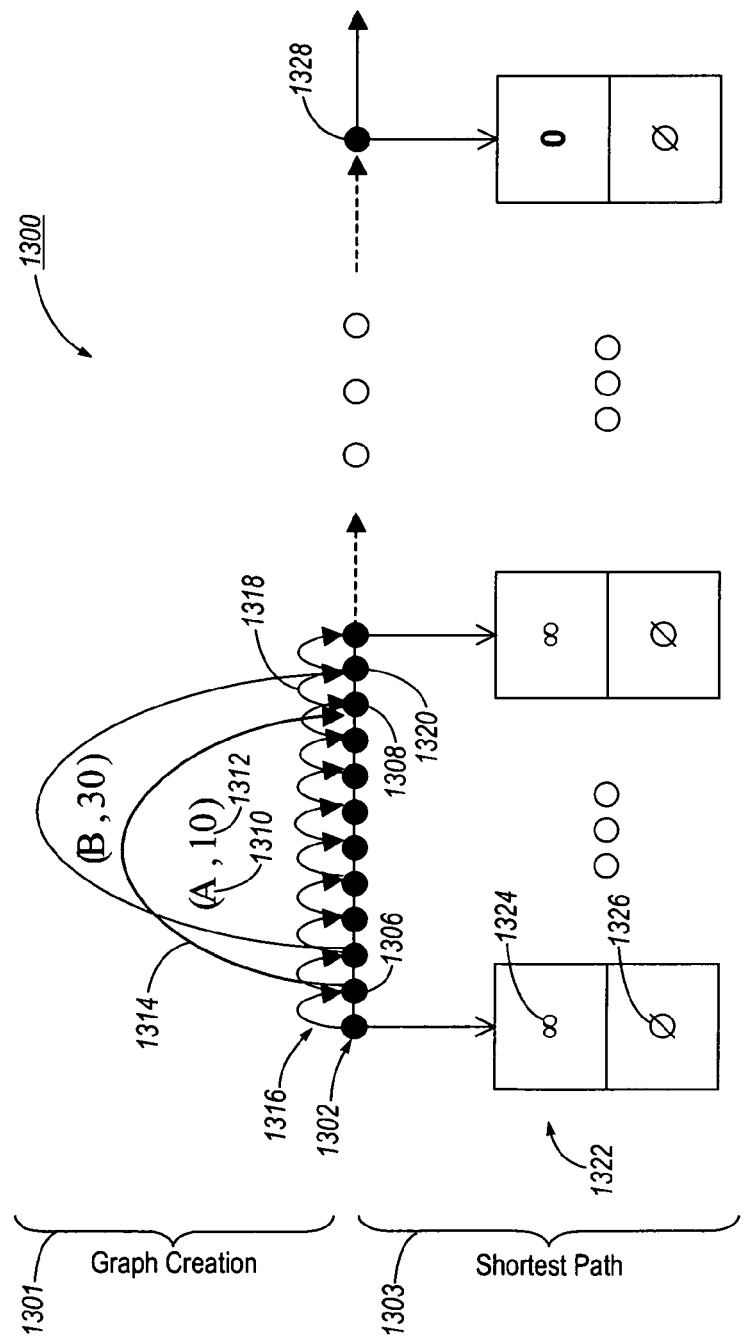
FIG. 13 illustrates a graph with nodes for a bitmap representation of the character 802 of the line of the primary channel 800 shown in FIG. 8.

The definition of a graph begins at step 1202 by defining nodes of the graph at every pixel along a line of the bitmap primary channel 214. For example, FIG. 13 illustrates graph creation at 1301 and shortest path computation at 1303. Graph creation begins by defining a graph 1300 with nodes 1302 for the bitmap representation of the character 802 of the line of the primary channel 800 shown in FIG. 8. At step 1203, at each node all possible arcs are enumerated using a template library. At step 1204, an arc score is computed at each of the enumerated arcs by matching the character in the template library with the character in the image.

More specifically, the arc score is computed for each enumerated arc using a matching function. This computation is a measurement of the match between a particular template in the library and the image region at the image point defined by the node. While there is some flexibility in choosing a matching function, it is usually closely proportional to the minus logarithmic probability of the match. This allows the score of the arc to be smaller for better matches, and the shortest path to identify the best interpretation of the entire line. An example of a matching function is disclosed in by Kopec et al. in "Document Image Decoding Using Markov Source Models," IEEE Transactions on Pattern Analysis and Machine Intelligence, Vol. 16, No. 6, June 1994, pp. 602–617, which is incorporated herein by reference.

The arc score and template is recorded in the form of an arc to another node. For example as shown in FIG. 13, arc 1314 is defined between nodes 1306 and 1308 by template 1310 (i.e., "A") and an arc score 1312 (i.e., "10"). More specifically, arcs are weighted by the quality of the match (the lower the score the better the match) and they connect nodes with positions separated by the width of the template identified by the match.

In order to accommodate slight shifts in spacing between adjacent templates, spacer arcs (identified in FIG. 13 by reference number 1316) are defined. For example, spacer arc 1318, which also has a score (not shown) may fill a spacing between the terminal node 1308 of template 1310 and a subsequent template for character 804 shown in FIG. 8 that may begin at node 1320.

At step 1206, a record 1322 is defined as shown with a cumulative score 1324 and a backpointer 1326 for each node 1302 (as shown at shortest path computation 1303 in FIG. 13). At step 1208, all the records 1322 of the nodes 1316 except for the last node of the line 1328 are initialized with an infinite score (i.e., the worst possible score or path) and a NIL backpointer. The score for the record for the last node of the line 1328 is initialized at step 1208 to zero (i.e., the best possible score or path).

At steps 1210 and 1212, the two passes of the Viterbi algorithm are performed. During the first pass (i.e., forward pass) of the Viterbi algorithm performed at step 1210, the most likely path (i.e., best score) for arriving at each node (i.e., pixel position) is identified by using the most likely (i.e., shortest) path for arriving at all previously computed positions. The first pass is carried out until the end-point of the best path for each node is identified. In the description referring to FIGS. 14 and 15 below, it will be appreciated by those skilled in the art that in this instance it is useful to build the partial shortest path from the back of a graph, thereby reversing the typical direction of the first and second pass of the Viterbi algorithm.

Figure 14:
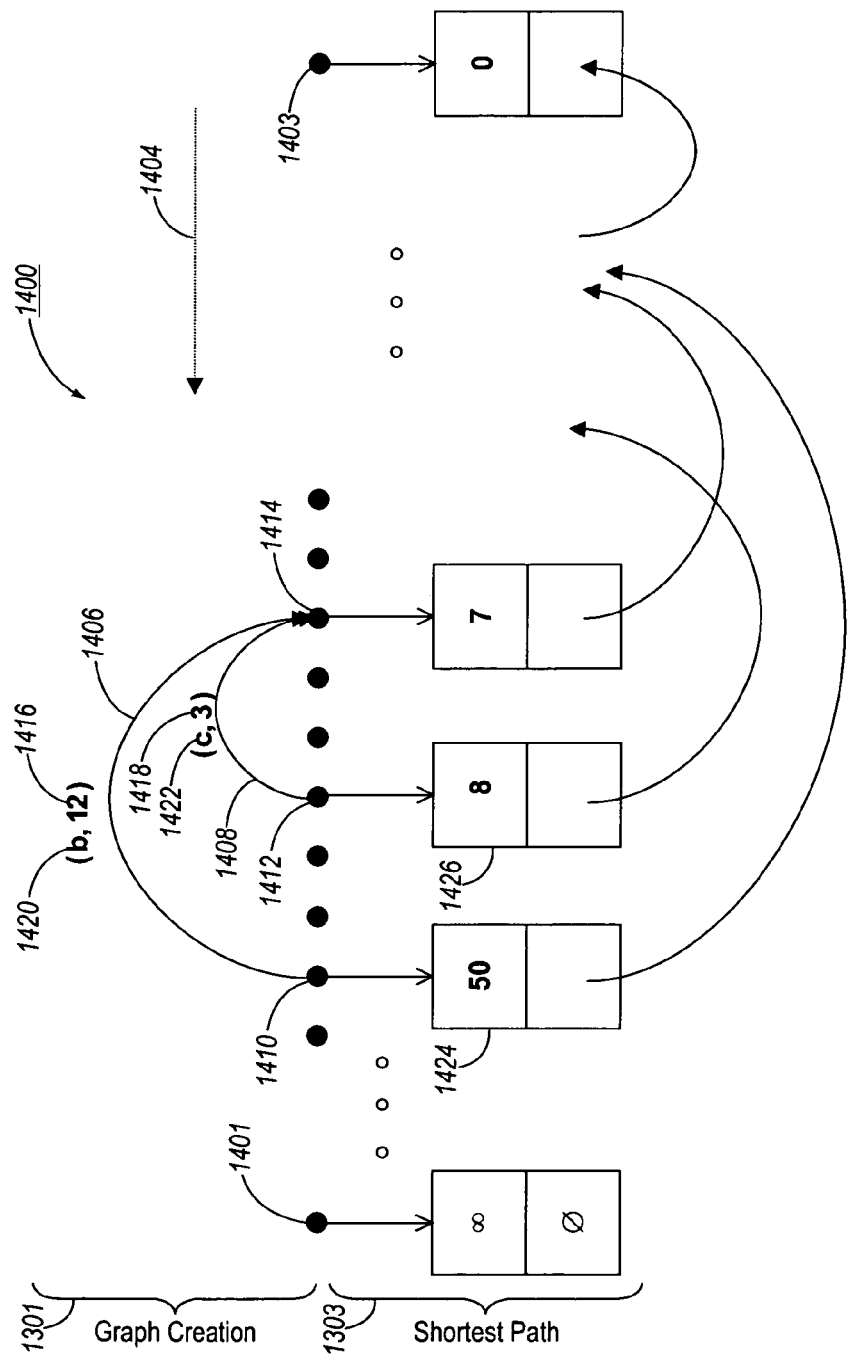
FIG. 14 illustrates an example of a forward pass computation using the Viterbi algorithm.

FIG. 14 illustrates an example of forward pass computation of the Viterbi algorithm of a graph 1400 defined by the set of nodes identified from node 1401 to node 1403. The forward pass is performed in the direction indicated by arrow 1404 (i.e., forward or first direction) from node 1403 to node 1401. For simplicity, only the scores 1416 and 1418 and templates 1420 and 1422 for arcs 1406 and 1408 starting at nodes 1410 and 1412, respectively, and terminating at node 1414 are shown. In computing the shortest path for the node 1414 at step 1210, a determination is made as to whether the score and backpointers in records 1424 and 1426 of nodes 1410 and 1412, respectively, should be updated to point to node 1414 to define a shorter path. If updated the new score of node 1410 would be 19 (i.e., 12+7) while if updated the new score of node 1412 would be 10 (i.e., 3+7). Because the score of node 1410 would be improved if updated, it is updated with a new score and backpointer (see FIG. 15) to node 1414 (i.e., 19 is better than 50). In contrast, the score of node 1412 would not be improved if updated with the new score from node 1414, and it is therefore not updated (i.e., 10 is worse than 8).

Figure 15:
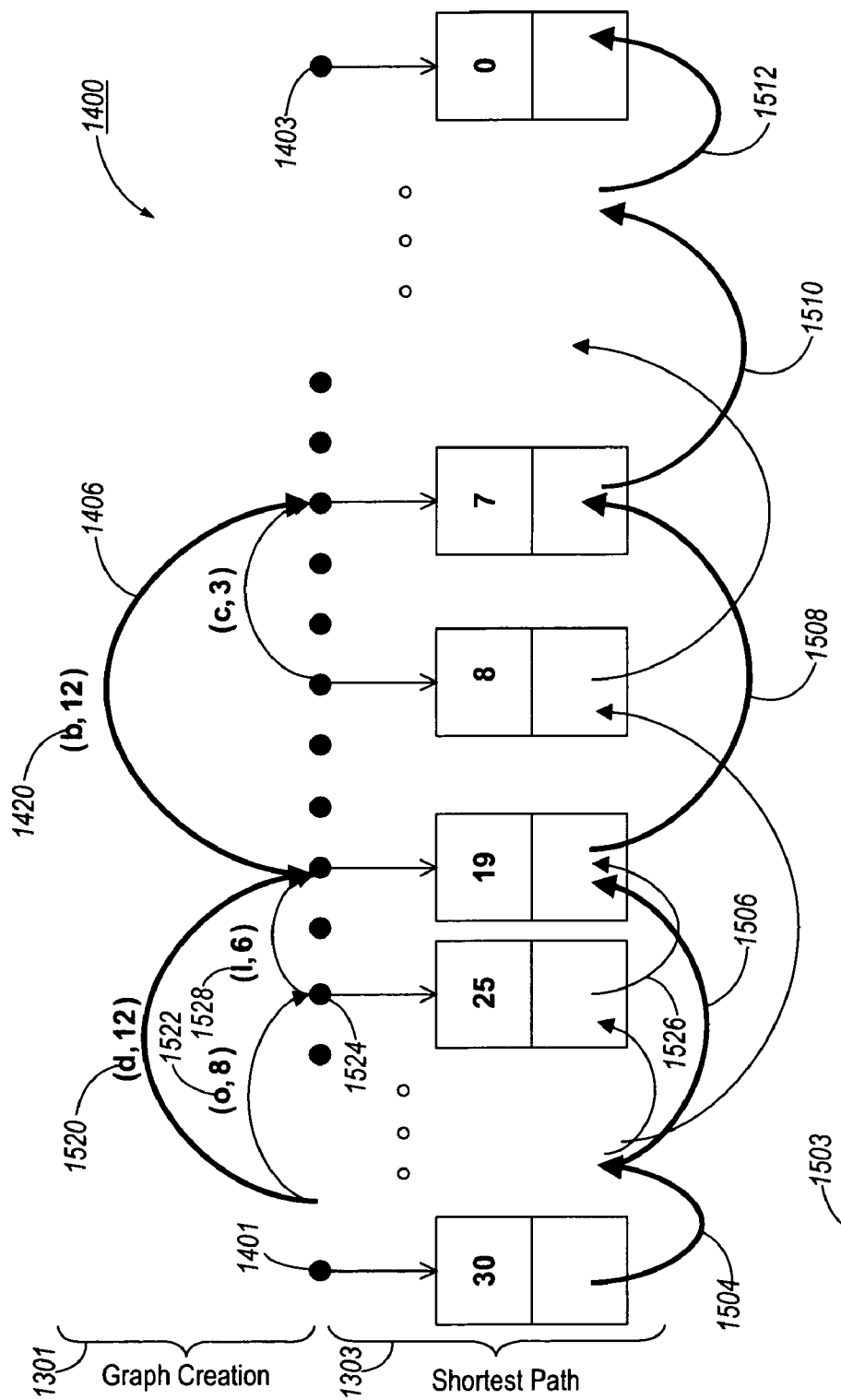
FIG. 15 illustrates an example of backtracing (i.e., backward pass computation of the Viterbi algorithm) of the graph developed in FIG. 14.

During the second pass (i.e., backwards pass) of the Viterbi algorithm performed at step 1212, the graph constructed during the first pass is backtraced from the first node of the graph to identify the actual best path (i.e., shortest) through the graph. FIG. 15 illustrates an example of backtracing of the graph 1400 developed in FIG. 14. Backtracing is performed in FIG. 15 in the direction indicated by arrow 1503. Although many different paths may exist, the best path is defined by backtracing the path through the graph that begins at the backpointer of the last node processed during the first pass (i.e., backpointer 1504 of node 1401). From the backpointer 1504 of the node 1401, a path of backpointers (e.g., 1504, 1506, 1508, 1510, 1512) that identifies a set of arcs (e.g., backpointer 1508 identifies arc 1406) that specify a template of a character (e.g., template 1420). This set of arcs identifies templates that match symbols of the primary channel. That is, the shortest path of the first dimension of the product graph defines an output string that is formulated without assistance of the assist channel 219.

To incorporate an assist channel in the product graph, the computation of the shortest path 1201 is deferred until the product graph is defined. At step 1114, a graph of the assist channel 219 is determined to define a second dimension of a product graph. More specifically at step 1114, nodes are defined at each of the identifiers 708 encoded in the assist channel. The arc from one node to the next is given the value of the identifier. In addition, each node includes an arc that returns to itself (i.e., a self-returning arc, e.g., arc 1630) to accommodate the presence of spacer arcs 1316 during computation of the shortest path.

Finally at step 1116, the shortest path of a product graph is defined using the one-dimensional graphs defined at steps 1112 and 1114. That is, step 1116 identifies a shortest path through the product graph using the bitmap primary channel 214 and the assist channel 219 to define the observed image (i.e., primary channel 112). Steps 1110, 1112, 1114, and 1116 repeat for each line in the bitmap primary channel 214 at step 1118. Once all lines of the primary channel have been processed at step 1120, the primary channel 112 can be viewed on display 104 in, for example, the document 102 as image data 114.

Figure 16:
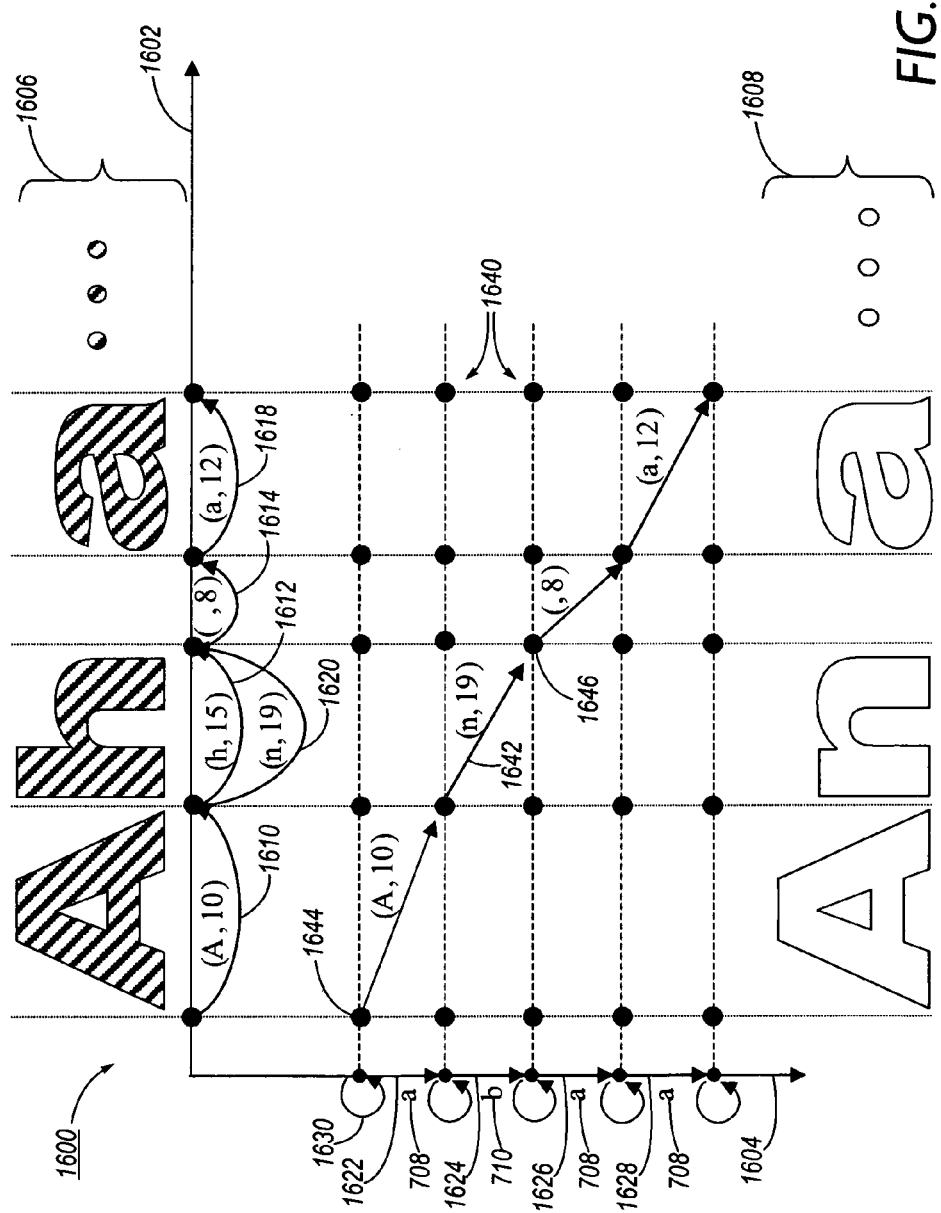
FIG. 16 illustrates an example a shortest path computation of a product graph.

FIG. 16 illustrates an example of a shortest path computation of a product graph at step 1116 in FIG. 11. The product graph 1600 illustrated in FIG. 16 includes a first dimension 1602, defined by a graph produced at step 1112 in FIG. 11, and a second dimension 1604, defined by a graph produced at step 1114 in FIG. 11. The first dimension 1602 of the product graph represents a bitmap line of text of the primary channel 800 shown in FIG. 8 and the second dimension 1604 of the product graph represents a corresponding line of the assist channel 900 shown in FIG. 9.

For illustrative purposes the product graph 1600 shown in FIG. 16 only includes the first four symbols of the primary channel (i.e., 802, 804, 806, and 808 as shown in FIG. 8), the first four identifiers of the assist channel (i.e., 902, 904, 906, and 908 as shown in FIG. 9), and only a few template matches. For comparison purposes, the product graph 1600 illustrates both its resulting output string 1608 and the output string produced by computing a shortest path of the graph of the bitmap primary channel in the one dimension 1602, which includes a set of arcs 1610, 1612, 1614, and 1618. Computation of the shortest path of the graph 1600 in the single dimension 1602 is performed without input from the assist channel and produces output string 1606, which includes characters "Ah a".

The product graph 1600 includes nodes 1640 that identify both position in the image along dimension 1602 and position in the corresponding assist channel along dimension 1604. Also, the product graph 1600 includes arcs that must be consistent with the assist channel. That is, for each arc in the first dimension with a template label and for each arc in the second dimension with a classification label, there exists a corresponding arc in the product graph if the template is the right class. The arcs 1622, 1624, 1626, and 1628 along the second dimension 1604 correspond to the class identifiers 902, 904, 906, and 908 of FIG. 9 that respectively identify the groups of symbols 702, 704, 702, and 702 shown in FIG. 7. Once the product graph 1600 is defined, computing the shortest path of the product graph produces the output string 1608, which includes characters "An a".

As shown in FIG. 16, the output of an unassisted decoded primary channel 1606 is corrected using the assist channel in the product graph 1600. In defining the product graph 1600 at node 1646, the template "h" of the arc 1612, which has a computed score of 15, is excluded by the assist channel. The arc 1612 from the graph of the bitmap primary channel is excluded from the product graph because it does not satisfy the second entry in the assist channel defined by the arc 1624. That is, the template "h" identified by the arc 1612 falls in the group 702 in FIG. 7 (i.e., the "a" group) instead of group 704 (the "b" group, as shown in FIG. 7) as specified by the identifier 710 of arc 1624. Consequently for the templates illustrated in FIG. 16, only the template "n" of the arc 1620 that has a higher score of 19 and satisfies the second entry in the assist channel (i.e., arc 1624) is allowed as a valid arc at position 1642 in the product graph.

More specifically with reference to the steps shown in FIG. 11, FIG. 16 illustrates a product graph 1600 that produces decoded primary channel 1608 from a scanned representation of primary channel 800 shown in FIG. 8. Initially a graph of the primary channel is determined in a first dimension 1602 (step 1112). Subsequently, a graph of the assist channel is determined in a second dimension (step 1114). Initially, a product graph is defined by combining the graph of the primary channel and the graph of the assist channel (step 1116). Determining the shortest path of the product of the graph of the primary channel and the graph of the assist channel produces output string 1608 (step 1116).

It will be appreciated by those skilled in the art that only a portion of the arcs and nodes defining the product graph 1600 is shown for simplicity in FIG. 16. In one embodiment in accordance with the steps 1201 in FIG. 12 for computing the shortest path of a graph, the shortest path of the product graph 1600 is computed by performing a first pass in an order from bottom to top and right to left. In this embodiment, the first pass of the product graph assumes that the bottom most nodes in the product graph take priority over the right most nodes. The second pass is performed by selecting the path defined by the upper-left node 1644 of the product graph 1600.

It will be appreciated by those skilled in the art that for simplicity the product graph 1600 does not show the plurality of arcs that extend from each of the nodes 1640 and identify all the possible matches that satisfy the assist channel between templates from the template library and the bitmap primary channel. In an alternate embodiment, the number of arcs that define the product graph 1600 is reduced by including only those arcs extending from those nodes centered around the diagonal of the product graph. By allowing a generous amount of variance, this alternate embodiment assumes that the assist channel is used at a uniform rate across a line in the image.

D. Assist Channel Block Coding

A second method of assist channel coding, referred to herein as "block coding", groups characters in the primary channel of a hardcopy document into vertical columns. Guard digits (i.e., error correcting codes) are computed for each of the vertical blocks and encoded in the assist channel of the hardcopy document. Decoding of the primary channel with the assist channel is advantageously synchronized at each vertical block. That is, desynchronization that may occur during OCR processing of a line of text is minimized because synchronization of the primary channel with the assist channel occurs at each vertical block of the primary channel.

D.1 Assist Channel Block Encoding

Figure 17:
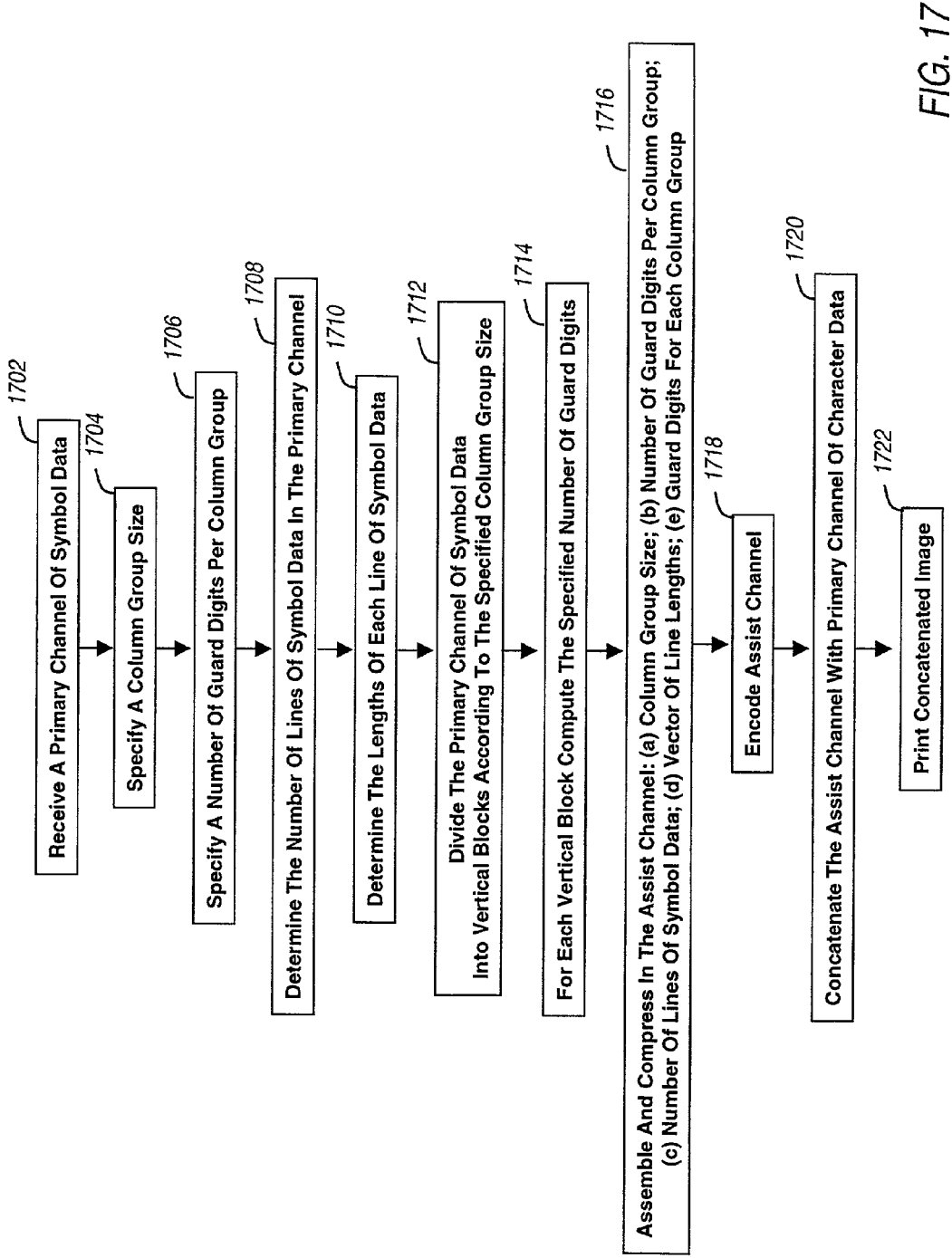
FIG. 17 is a flow diagram of the steps for carrying out block encoding of an assist channel.

FIG. 17 is a flow diagram of the steps for carrying out block encoding of an assist channel. In one embodiment, these steps are carried out by the electronic assist channel 110 shown in FIG. 1. At step 1702, the encoding/compression module 116 receives a primary channel of data 112. For example, FIG. 18 illustrates an example of a primary channel of data 1800. At step 1704, a column group size is specified. The column group size may be fixed or vary from one column group to the next. More specifically, the column group size identifies how many symbols (e.g., characters) define the column group along each line of the primary channel. At step 1706, the number of guard digits per column group is specified. It will be appreciated by those skilled in the art that the more guard digits specified at step 1706, the greater the number of errors the guard digits will be able to correct, but the larger the assist channel will be.

At step 1708, the number of lines of symbol data (e.g., characters) in the primary channel is determined. Subsequently at step 1710, the length of each of the lines of symbol data is determined. At step 1712, the primary channel of symbol data is divided into vertical blocks according to the specified column group size. At step 1714, the number of guard digits specified per column group at step 1706 is computed for each the vertical blocks produced at step 1712. In one embodiment, guard digits are computed by applying error correcting Reed-Solomon codes. Computation of Reed-Solomon codes is well known as disclosed by Peterson et al, in "Error-Correcting Codes," MIT Press, 1972, which is hereby incorporated by reference.

For example, when five-error correcting Reed-Solomon codes with a $2^8$ symbol alphabet are applied, the maximum block size in the assist channel would be 255 digits including 10 guard digits (i.e., check digits). Further assume that 40 lines of text (i.e., symbol data) are grouped into columns with a column group size of two. This example then requires a block size of 90 characters (i.e., 40*2+10=90)HH, which is well less than the maximum block size of 255 digits for a Reed-Solomon code over a $2^8$ symbol alphabet. Given this encoding scheme, the size of the guard digits would be one bit per character (i.e., a compression ratio of 8 characters to 1 guard digit) and, as long as there are no more than five OCR errors per block, the page should decode error free.

FIG. 19 illustrates an example in which guard digits are computed for specified vertical blocks of symbol data of the primary channel shown in FIG. 18. More specifically in FIG. 19, the primary channel symbol data is divided into vertical blocks with a block size of two symbols wide (step 1712), as indicated by reference number 1902. For each of the vertical blocks of symbol data, corresponding guard digits 1904 are computed (step 1714). When a line (e.g., line 1906) of the primary channel does not extend as far as another line (e.g., line 1908), then empty symbols (e.g., empty symbol 1910) are added to that line to compute that column's guard digits (e.g., 1912).

Figure 20:
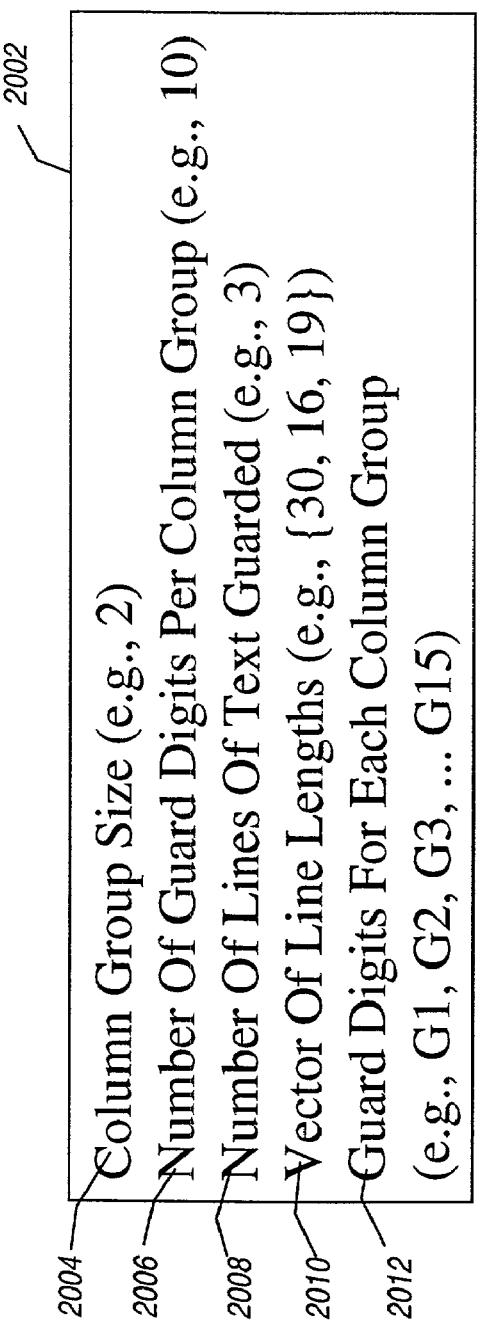
FIG. 20 illustrates data assembled for the example primary channel of data shown in FIG. 18.

Once guard digits for each of the vertical blocks have been computed at 1714, data for the assist channel is assembled and compressed. FIG. 20 illustrates data 2002 assembled at step 1716 for the example primary channel shown in FIG. 18. More specifically, the data 2002 includes the column group size 2004, the number of guard digits per column group 2006, the number of lines of symbol data guarded 2008, a vector of line lengths 2010, and guard digits 2012. In one embodiment, some of the data 2002 (e.g., vector of line lengths 2010) is compressed at step 1714 using a lossless compression technique.

Once the assist channel is compressed at step 1716, it is encoded at step 1718. In one embodiment, the assist channel is encoded using data glyphs, as shown for example in FIG. 10. At step 1720, the encoded assist channel is concatenated with the primary channel and printed at step 1722 using for example printer 108.

It will be appreciated by those skilled in the art that the manner in which the primary channel is encoded may vary. In one embodiment, the primary channel is divided into column groups that have a fixed size and a fixed number of guard digits each. In an alternate embodiment, the primary channel is divided column groups of varying size, and/or with a varying number of guard digits assigned to each column group. For example, the number of guard digits may vary for the end column because that column may have less characters since some lines may terminate before the last column. Also, the number of guard digits may be larger for a particular column if the information in that column is determined a priori to require a greater degree of decoding accuracy (e.g., column of a bank check containing the amount information).

D.2 Assist Channel Block Decoding

Figure 21:
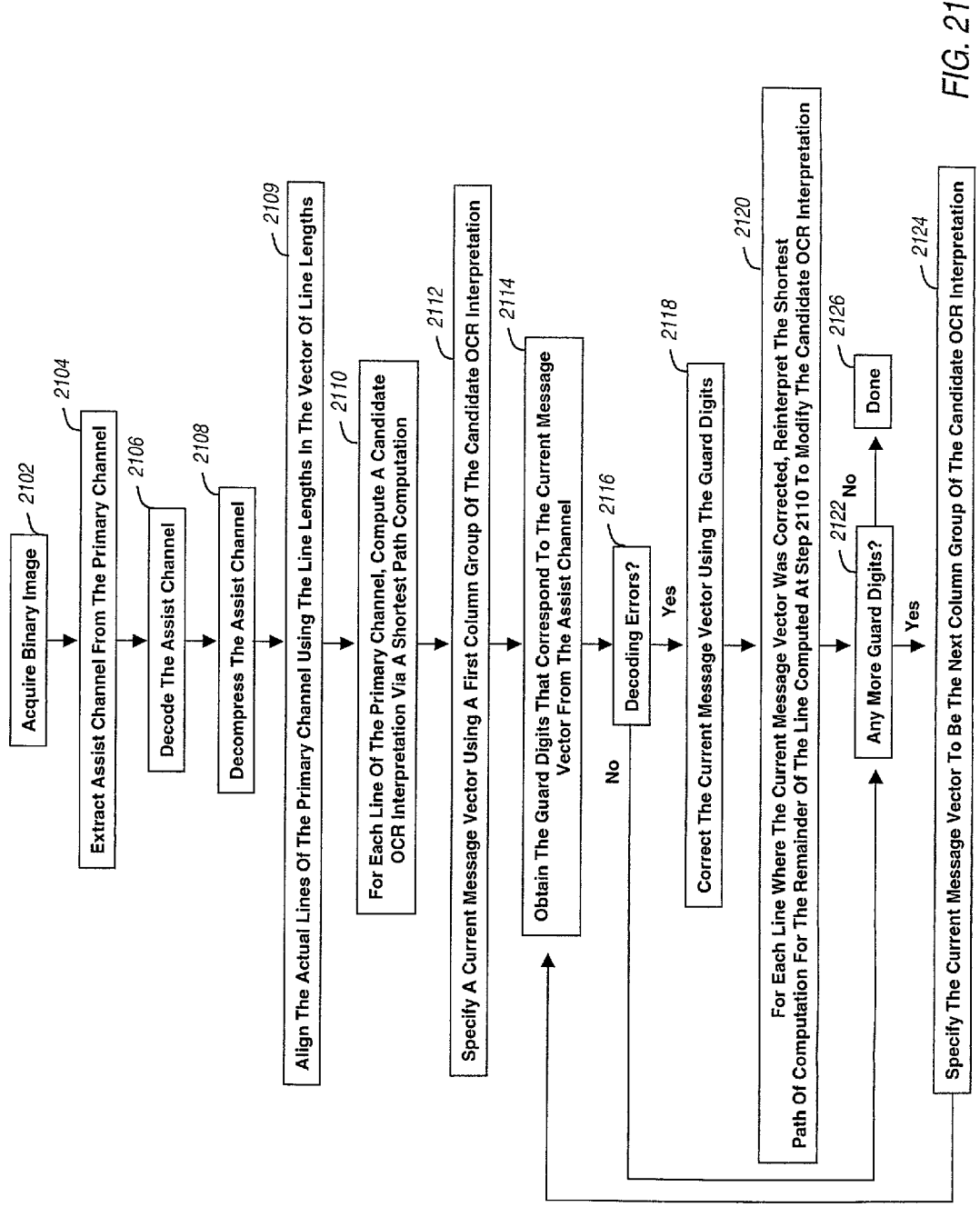
FIG. 21 is a flow diagram that sets forth the steps performed by the hardcopy assist channel for decoding a scanned hardcopy document with a block encoded assist channel.

FIG. 21 is a flow diagram that sets forth the steps performed by the hardcopy assist channel for decoding a scanned hardcopy document with a block encoded assist channel. As shown in FIG. 2, initially at step 2102 a bitmap image 206 of hardcopy document 106 is acquired using a scanner. The hardcopy document 106 in this instance includes a primary channel 124 and a block-encoded assist channel 126. At step 2104, the image extraction module 210 extracts the assist channel 118 and the bitmap primary channel 214 from the bitmap image 206. The assist channel 118 is decoded at step 2106 and decompressed at step 2108 by module 212. At step 2109, the bitmap primary channel is aligned using the line lengths from the vector of line lengths 2010 to synchronize lines in the primary channel with the guard digits in the assist channel. Subsequently, the decompressed assist channel 219 and the bitmap primary channel 214 are input to decoder module 216, which performs steps 2110, 2112, 2114, 2116, 2118, 2120, 2122, 2124, 2126 and 2128.

At step 2110, a candidate OCR interpretation is computed via a shortest path computation for each line of the primary channel without the aid of the assist channel. In one embodiment, this shortest path computation is performed for each line using the Document Image Decoder discussed in detail above in Section C. More specifically, the DID performs the steps set forth in FIG. 12 to produce a shortest path through a graph with nodes and arcs as shown in FIGS. 14 and 15. The shortest path identified by backtracing through the graph during a second of two passes provides the "unassisted" candidate OCR interpretation of each line.

At step 2112, a current message vector is specified using a first column group of the candidate OCR interpretation. The dimensions of the column group are defined in the assist channel using the column group size and the number of lines of text guarded. At step 2114, guard digits that correspond to the current message vector are obtained from the assist channel. At step 2116, the guard digits obtained at step 2114 are used to check whether errors exist in the candidate OCR interpretation computed at step 2110. If errors exist then the current message vector is corrected using the guard digits (e.g., Reed-Solomon codes) at step 2118; otherwise, step 2122 is executed.

At step 2120, the remainder of the message vector of each line of the primary channel is identified that required correction at step 2118. For the remainder of the message vector not checked at step 2116, the shortest path computation performed at step 2110 is reinterpreted to produce a new or modified candidate OCR interpretation. Reinterpretation of remainder of each line of the primary channel is more fully described below with reference to FIG. 22. Finally, if all guard digits have been processed, then decoding terminates at step 2126; otherwise, decoding continues at step 2124 by specifying the current message to be the next vertical block of the candidate OCR interpretation. Once step 2124 completes, step 2114 repeats for the current message and (modified) candidate OCR interpretation.

Figure 22:
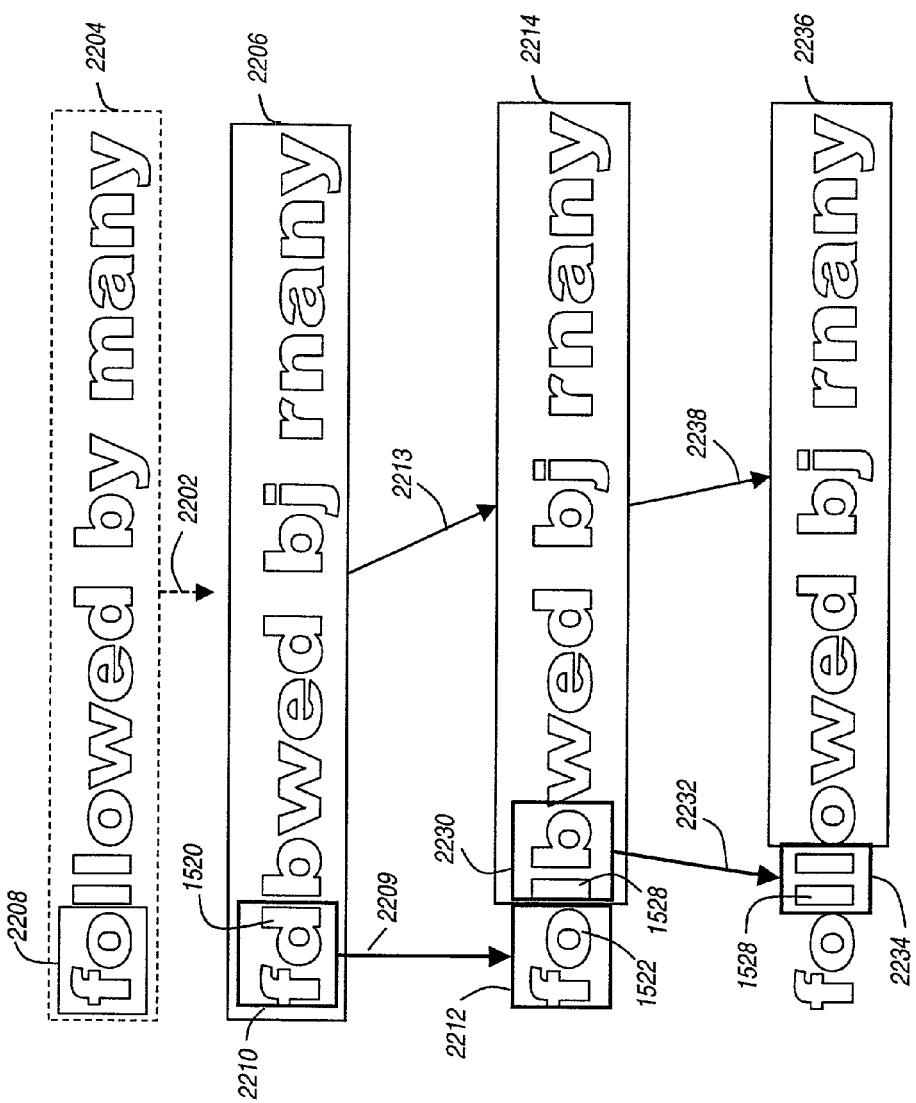
FIG. 22 illustrates a detailed example of a reinterpretation of a shortest path computation performed for a portion of the primary channel shown in FIG. 18.

FIG. 22 illustrates a detailed example of a reinterpretation of a shortest path computation performed for a portion 1802 of the primary channel 1800 shown in FIG. 18. More specifically, FIG. 22 illustrates how to use an assist channel to reinterpret and realign a candidate OCR interpretation 2206 when errors in OCR processing are identified. Initially, the candidate OCR interpretation 2206 is computed using the Document Image Decoder from an extracted bitmap primary channel 2204 (step 2110), which is indicated generally by arrow 2202. Note that only a portion 1802 of the extracted bitmap primary channel 1800 is shown in FIG. 22.

Subsequently, the guard digits 1918 for first column group 1920, shown in FIG. 19, are used to determine whether an error exits in the decoded candidate OCR interpretation for that column group (step 2116), which is indicated generally by arrow 2209. Note that only the portion 1922 of the column group 1920, shown in FIG. 19, is identified in FIG. 22 as portion 2208. Using the guard digits to evaluate the column group that includes portion 2210, the guard digits corresponding to that column group are used to identify errors in the decoding of the bitmap portion 2208 and provide a corrected decoded portion 2212 (step 2118).

After the first column group, any line that was corrected is reinterpreted to provide a new candidate OCR interpretation (step 2120), which is indicated generally by arrow 2213. In FIG. 22, the new candidate OCR interpretation 2214 is provided after reinterpreting the candidate OCR interpretation 2206 in view of the corrected decoded portion 2212. Using the DID discussed above with reference to FIG. 15, reinterpretation of the candidate OCR interpretation 2206 in view of the decoding error corrects the character "d" and replaces it with the characters "ol", as identified in FIGS. 15 and 22 using reference numbers 1520, 1522, and 1528, respectively. Because of the new character 1522, the graph 1400 is realigned so that the new template terminates at node 1524, as shown in FIG. 15. Backtracking from node 1524, reinterprets a new path of backpointers (e.g., 1526, 1508, 1510, 1512) that identifies a new set of arcs that specify a new set of templates, thereby obtaining the new candidate OCR interpretation 2214 in FIG. 22.

After reinterpretation of the DID graph, the new candidate OCR interpretation 2214 now identifies a new template 1528 in FIGS. 15 and 22. Error identification and correction of the new candidate OCR interpretation 2214 is conducted for the next column group, which includes the portion 2230. As performed for the portion 2210 of OCR interpretation 2206, the image portion 2230 of OCR interpretation 2214 is first examined for errors and corrected if necessary, as indicated by arrow 2232. Subsequently, given that errors were identified and corrected at image portion 2234, the OCR interpretation 2214 is reinterpreted as new OCR interpretation 2236 as indicated by arrow 2238. The process illustrated in FIG. 22 continues until each column group of the OCR interpretation has been analyzed in accordance with the flow diagram shown in FIG. 21.

It will be appreciated by those skilled in the art that various techniques can be used to reinterpret a line of OCR output. In particular, the string output of any OCR system can be realigned with a partially corrected line to minimize the string edit distance (i.e., the number of changes required to make one string identical to another) between the corrected prefix and the original OCR interpretation.

Computing error correcting codes for a page, or more, of a hardcopy document along vertical partitions (that may vary in size), supplements the natural synchronization points at the beginning and the end of each line of text and/or a page. As illustrated in FIG. 22, as error detection and correction progresses across a decoded line of text, successful corrections of the previous block 2212 synchronize corrections of a subsequent block 2230. Advantageously, by computing guard digits for vertical column groups of the primary channel, the decoder module 216 is synchronized at each column group. Without the vertical column groups that provide multiple synchronization points along a line, the OCR decoder may incorrectly match different width characters and misalign with the error correcting code. In addition, the OCR decoder without proper synchronization may generate continuous strings of errors that may exceed the error correcting capacity of the assist channel.

In addition, it will be appreciated by those skilled in the art that the more lines of text guarded per symbol block, the greater the compression achieved by the assist channel. Also, it will be appreciated by those skilled in the art that block coding requires multiple symbol lines to provide a sufficient number of synchronization points. That is, if there are only a few lines, then a set of synchronization points in the middle of lines can be added to the data 2002 in the assist channel. The synchronization points in a set of synchronization points for the guard digits identify the locations of the first column group of the same or different lines of text on one or more pages. This allows more than one column to be guarded by the same set of guard digits. For example, a page with multiple columns of text (e.g., a newspaper) can be encoded by describing a set of synchronization points that identify the start of lines of multiple columns of message digits. Alternatively, the start of each line of a multi-page document with only a few lines per page can be described with a set of synchronization points that identify the start of lines on different pages.

D.3 Extended Assist Channel Block Coding

Although block error coding provides improved synchronization while identifying and correcting errors during OCR processing, block error coding does not use any information about the likely errors produced during OCR processing. Presented in this section are two alternate embodiments for extended assist channel block coding that use information about likely errors produced during OCR processing.

In one embodiment, decoding can be performed by finding the most likely original message vector at step 2118 in FIG. 21, rather than the nearest message vector. For example, correction of the current message vector may be performed by making two corrections such as changing a "c" to an "o" and an "l" to a "1", rather than a single, less likely, correction. In this embodiment, the effective error correction per bit of the assist channel is improved. A disadvantage of this embodiment is that maximum likelihood decoding of block codes is computationally difficult.

In another embodiment less computationally demanding, separation-coded error correction is performed by recoding the character codes. The character codes are recoded so that the OCR errors that are most likely to occur are assigned more guard digits than OCR errors that are less likely to occur. That is, more error correction is applied to those bits that are more susceptible to errors during OCR processing. For example, Table 2 illustrates a separation code with four equivalence classes, developed using the techniques set forth above. The four equivalence classes or group codes (i.e., GC) allow printed characters to be coded with two high order bits. Each group code identifies a unique equivalence class of character codes (i.e., CC) or group specific character codes.

TABLE 2

| GC | Character Code |
|----|----------------|
| 00 | !, ", #, $, %, &, (, *, +, ., /, 0, 1, 2, 4, 5, 6, 7, 8, 9, ;, <, =, >, @, C, J, K, L, N, P, V, X, Y, Z, [, \, ] , , _, ', n, o, z, {, \|, }, ~ |
| 01 | A, ;, ), -, 3, :, ?, F, H, I, M, O, W, b, c, j, t, v, x |
| 10 | ", D, E, G, Q, R, S, T, d, e, f, g, i, k, m, u, w, y |
| 11 | B, , U, a, h, l, p, q, r, s |

The two high order bits that identify the equivalence classes which separate characters are much more likely to be changed during OCR processing than the lower ordered bits alone. Thus, stronger error correction is applied to the higher ordered bits, in the vertical arrangement shown in FIG. 19.

When encoding a hardcopy document as shown in FIG. 17 for the case of block coding, this embodiment includes performing at step 1706, the step of specifying, for an encoding scheme as set forth in Table 2, the number of guard digits per group code and the number of guard digits per character code. For example, for approximately the same space used in a 5-digit error correcting code that does not use group codes, this encoding scheme enables an 8-digit error correcting code to be applied to the high order ("group code") 2-bits, and a 2-digit error correcting code to be applied to the low order ("character code") 6-bits.

In addition, when encoding a hardcopy document as shown in FIG. 17, original character codes are recoded to their group code and character code representation (i.e., gc.cc). For example, the character "A" would be recoded to the code "<01><000000>" from, for example, an ASCII encoding. Thus, with respect to the vertical arrangement in FIG. 19, the guard digit for G1, identified by reference number 1918, include a first set of guard digits that protect the group codes for the vertical column group 1920 and a second set of guard digits that protect the character codes for the vertical column group 1920.

When decoding, the decoder module is constrained to first find the best solution on lines with corrected high order bits to a particular equivalence class. Subsequently, the decoder module corrects the low order bits of the corrected high order bits. Corrections using the low order bits are constrained to correct only those characters that are within the identified equivalence class. In other words, first a decoded line is revised using the high order bits of the check digits. Subsequently, the line is further revised using the low order bits of the check digits. More specifically, FIG. 21 would be modified in this embodiment to include a high order bit "outer loop" and a low order bit "inner loop" of steps 2116, 2118, and 2120.

In an alternate embodiment, the column group size 2004 of the high order and low order guard digits varies. In one form of this alternate embodiment, high order bits of the guard digits are grouped in columns with a larger size (e.g., a larger column group size of 4) relative to the low order bits of the guard digits (e.g., a smaller column group size of 2). This encoding format groups high order bits of different columns together to encode with a larger symbol alphabet, thereby maximizing the error correcting utilization of Reed-Solomon coding.

E. Assist Channel Convolution Coding

A third method of assist channel coding, referred to herein as "convolution coding", hashes each character c; in a line of characters in the primary channel sequentially to compute a recurrence of a hash function. More specifically, at each position in a line of text, the current hash is combined with the current character code and hashed again, thereby producing a chain of hash values where each character influences all hash values to the right of its position in a line of text. Each hash value in the chain is sampled (e.g., by selecting one bit of each hash value) and encoded in an assist channel. Subsequently, when decoding a scanned representation of the primary channel, template match searches are limited to those interpretations that produce matching sample values of a corresponding hash value. The number of incorrect interpretations that are explored before a proper match is identified is limited because any error in a line will likely cause the chain of hash values to differ for the rest of that line, with the consequence that the sample values will be less likely to match.

E.1 Assist Channel Convolution Encoding

Figure 23:
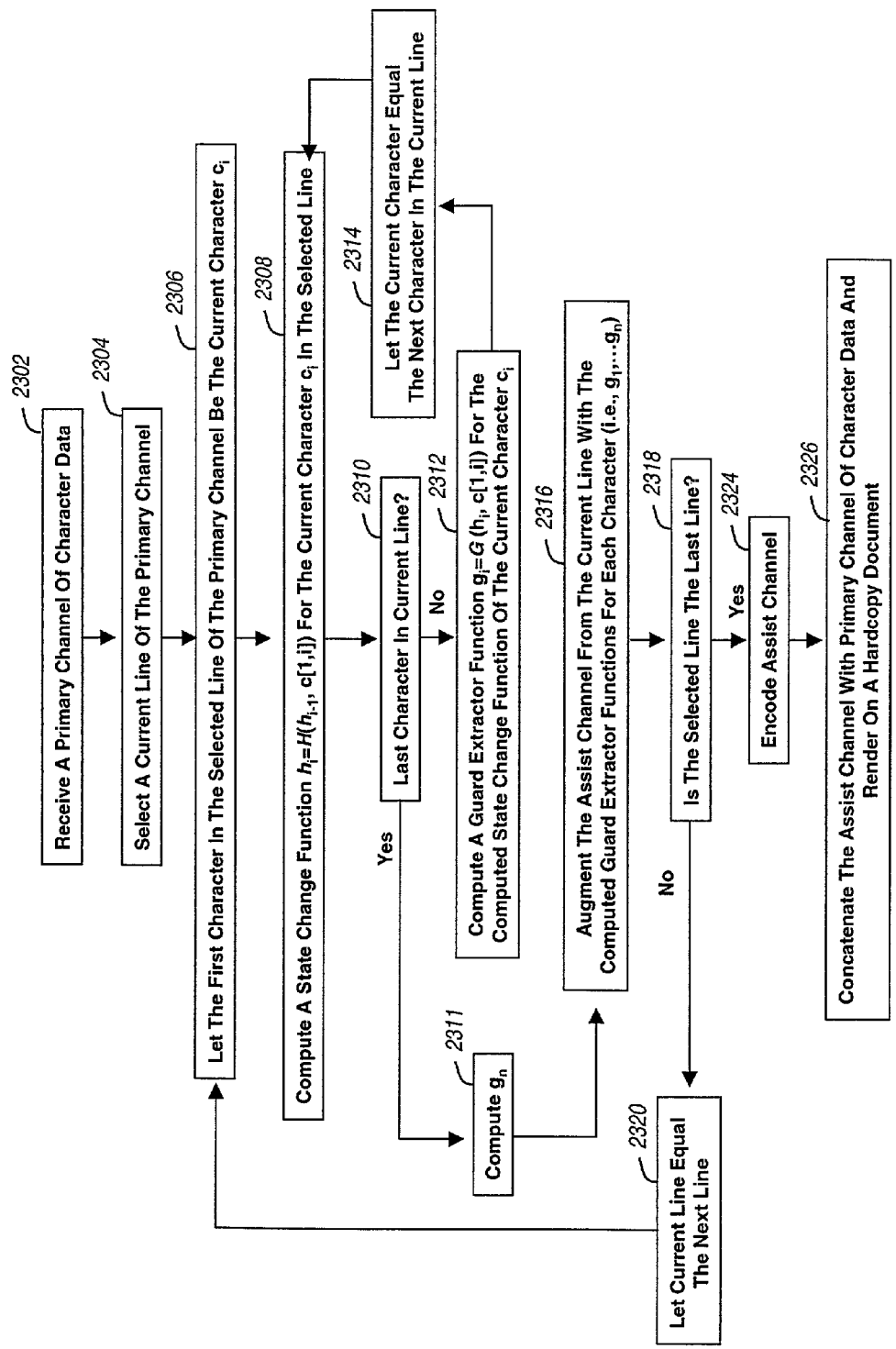
FIG. 23 is a flow diagram of the steps for carrying out convolution encoding of an assist channel.

FIG. 23 is a flow diagram of the steps for carrying out convolution encoding of an assist channel. In one embodiment, these steps are carried out by the electronic assist channel 110 shown in FIG. 1. At step 2302, a primary channel of data is received at for example encoding/compression module 116. The primary channel of data may contain any alphanumeric symbol that may be created on a hardcopy document by a printer, or the like. At step 2304, a current line of the primary channel of character data is selected. At step 2306, 2308, 2310, 2312, 2314 and 2316, each line of the primary channel is encoded in accordance with convolution encoding.

Initially at step 2308, the first character in the selected line of the primary channel (with characters $c_1, c_2, c_3, \ldots$) is identified as the current character $c_i$. Subsequently at step 2308, a recurrence or state change function $h_i = H(h_{i-1}, c[1,i])$ is computed, where $h_0 = 0$, $h_{i-1}$ is the previous value in the chain, and $c_i$ is the current character. Even though the state change function $H(h_{i-1}, c[1,i])$ may depend on any of the preceding characters (i.e., $c[1,i] = c_1, c_2, c_3, \ldots c_i$), the state change function often has a simple form such as $H(h_{i-1}, c_i)$. In one embodiment, the state function is implemented using a simple shift register as described in "Fundamentals Of Convolutional Coding," by Johannesson et al., Institute of Electrical and Electronics Engineers, Inc., 1999 (ISBN: 0-7803-3483-3), which is incorporated herein by reference. In alternate embodiments, more complex hash functions can be implement such as MD5 as described in Applied Cryptography, by Bruce Schneier, John Wiley & Sons, ISBN 0-471-11709-9, which is incorporated herein by reference. In selecting a hash function, it is desirable that the hash function have a large enough range (e.g., greater than $2^{32}$) so that the probability of different inputs having identical outputs is extremely small (e.g., $2^{-32}$).

If the last character in the current line has not been reached at step 2310, then at step 2312 a guard extractor function $g_i = G(h_i, c[1,i])$ is used to compute a guard value (i.e., $g_i$) for the state change function of the current character $c_i$. Even though the guard extractor function $G(h_i, c[1,i])$ can depend on all preceding characters (i.e., $c_1, c_2, c_3, \ldots c_i$), the guard extractor often has the simple form $G(h_i, q_i)$, where $q_i$, which may depend on any number of preceding characters (i.e., $c_1, c_2, c_3, \ldots c_i$), is a bit selector that identifies the number of bits of the guard value. The inputs of the guard extractor function G include $h_i$ (e.g., the hash of the current character) and $c[1,i]$ (i.e., previous characters, including the current character). Subsequently at step 2314, the current character is assigned to be the next character in the current line and step 2308 is repeated.

Figure 24:
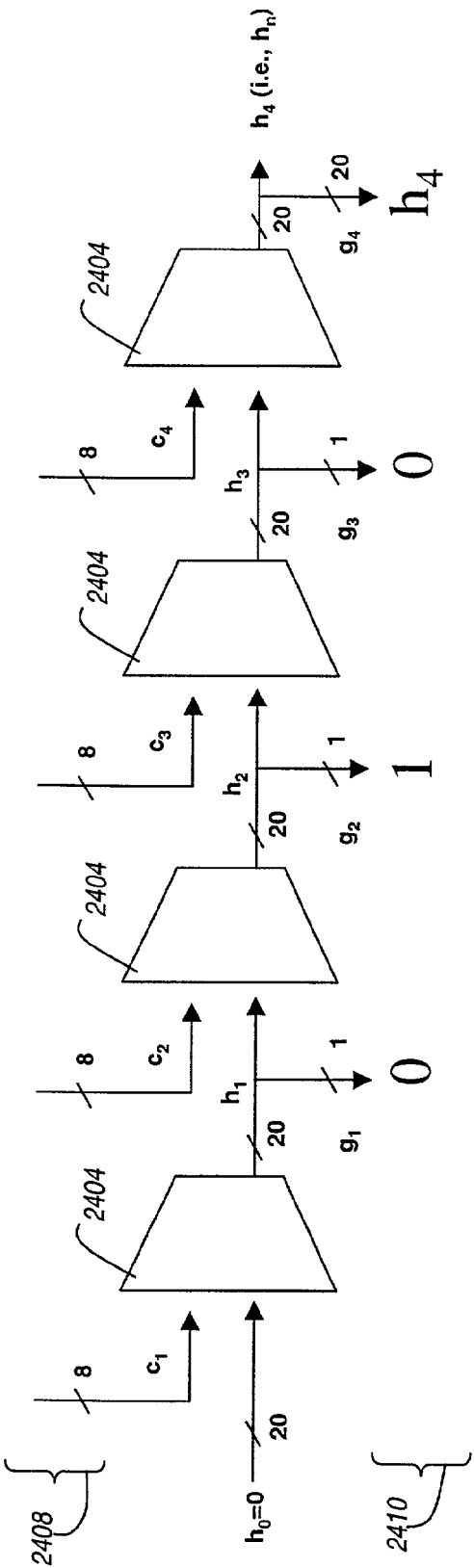
FIG. 24 illustrates a simplified embodiment of the computation of the state change function and the guard extractor function for a current line of a primary channel (i.e., "This") for the case where the number of bits of the guard value $q_i=1$.

FIG. 24 illustrates a simplified embodiment of the computation of the state change function and the guard extractor function for a current line of a primary channel 2406 (i.e., "This") for the case where $q_i = 1$. Each character of the primary channel 2406 is represented by character code 2408 (i.e., $c_1$, $c_2$, $c_3$, and $c_4$). In this embodiment, the guard extractor function is hardcoded to always selects the low order bit (i.e., $q_i = 1$) of the output of the one-way hash function 2404 (i.e., $h_i$) for all guard values in the chain except for the last guard value (i.e., $g_n$), which is selected in its entirety (i.e., all bits). This embodiment illustrates that the guard values 2410 produced as output to the guard extractor function can be fixed for a particular encoding scheme.

Figure 25:
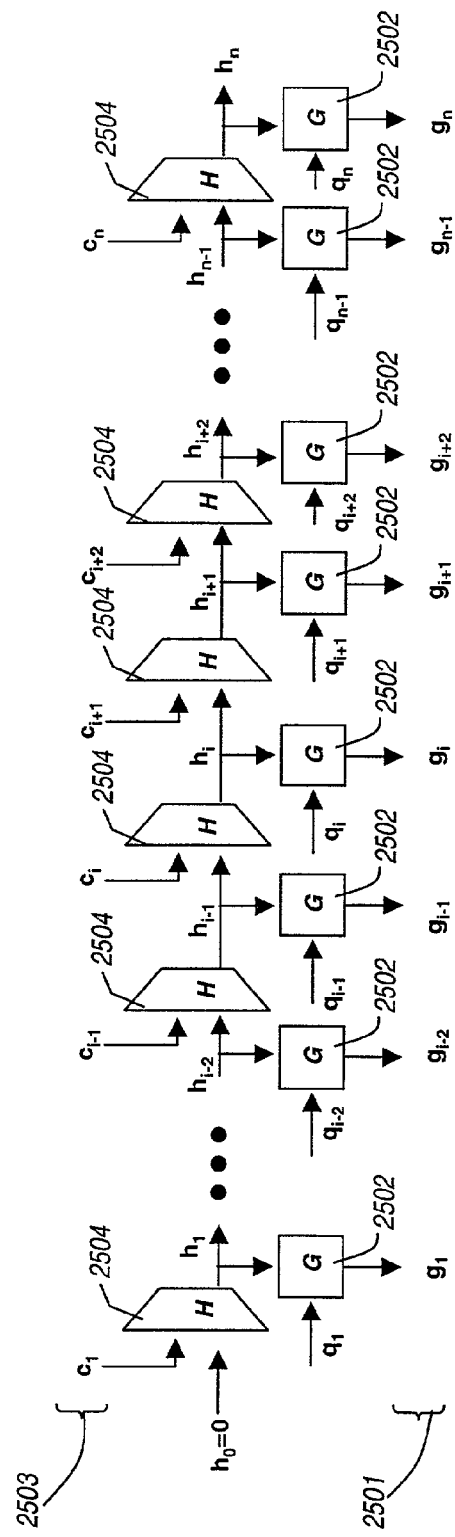
FIG. 25 illustrates a more generalized representation of the recurrent computation performed to produce guard values for each corresponding character code in a line of a primary channel.

FIG. 25 illustrates a more generalized representation of the recurrent computation performed at steps 2308 to produce guard values 2501 at step 2316 for each corresponding character code 2503 in a line of a primary channel. In this embodiment, the guard extractor functions $G(h_i, c[1,i])$ 2502 receive input from the corresponding state change functions 2504 (i.e., $h_i = H(h_{i-1}, c_i)$). The number of bits selected of the output of the state change function 2504 of the current character $h_i$ depends on the cumulative uncertainty in the value of the characters $c[1,i]$ (i.e., the more certain the fewer the number of bits selected). This uncertainty is quantified for each guard value by the value $q_i$, which is used to select a variable number of bits from each state $h_i$ to define the guard value(s) $g_i$.

Referring again to FIG. 23, if the last character in the current line has been reached at step 2310, then the guard value $g_n$ is computed at step 2311. Subsequently, the assist channel is augmented at step 2316 from the current line with the computed guard extractor functions (i.e., $g_1 \ldots g_n$). If the selected line is not the last line in the primary channel at step 2318, then the current line is assigned to be the next line in the primary channel at step 2320 and step 2306 is repeated; otherwise, the assist channel is encoded as machine-readable information using for example data glyphs at step 2324, as shown for example in FIG. 10. Finally at step 2326, the primary channel and assist channel are concatenated and rendered on a hardcopy document using for example a printer 108 shown in FIG. 1.

E.2 Assist Channel Convolution Decoding

Figure 26:
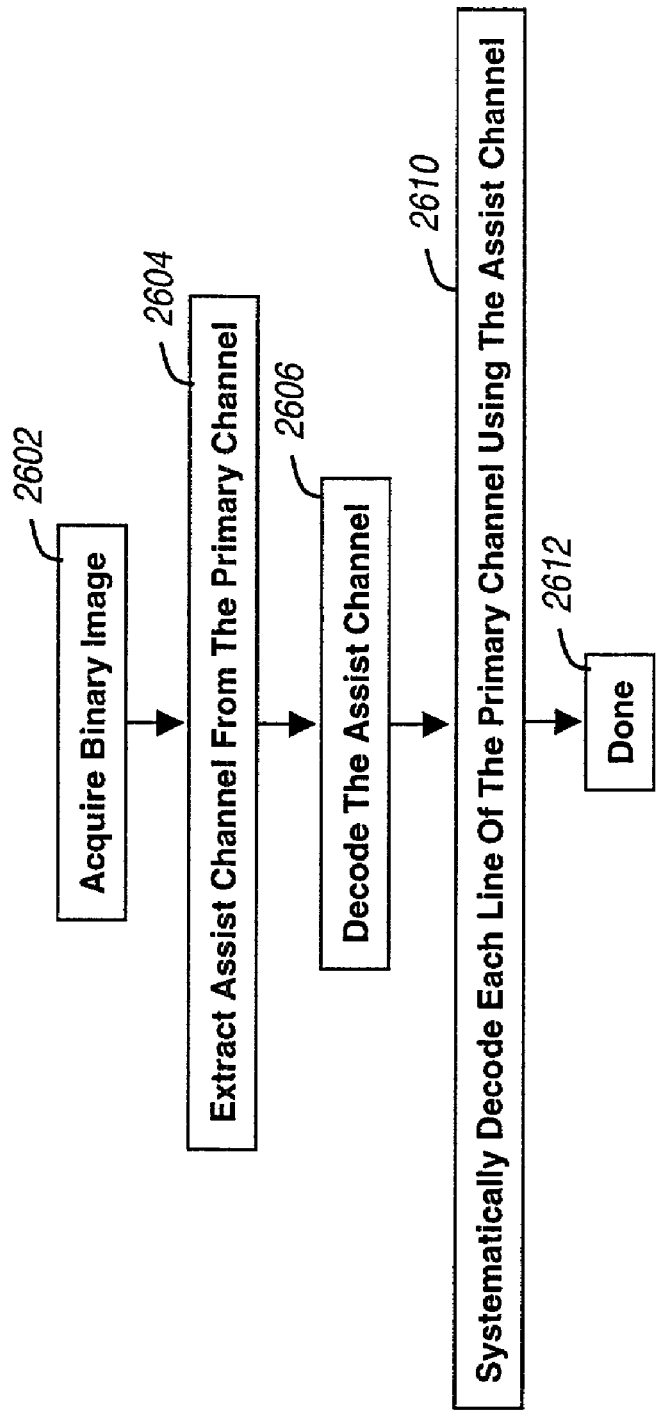
FIG. 26 illustrates a flow diagram that sets forth the steps performed by the hardcopy assist channel shown in FIG. 2 for decoding a scanned hardcopy document with a convolution encoded assist channel.

FIG. 26 illustrates a flow diagram that sets forth the steps performed by the hardcopy assist channel shown in FIG. 2 for decoding a scanned hardcopy document with a convolution encoded assist channel. Initially at step 2602, a bitmap image 206 is acquired using a scanner of hardcopy document 106. The hardcopy document 106 in this instance includes a primary channel 124 and a convolution-encoded assist channel 126. At step 2604, the image extraction module 210 extracts the assist channel 118 and the bitmap primary channel 214 from the bitmap image 206. The assist channel 118 is decoded at step 2606 by module 212. Subsequently at step 2610, each line of the bitmap primary channel is decoded using the decoded assist channel. Once the decoder module 216 completes at step 2612, a decoded primary channel 112 can be viewed in electronic form on display 104 as 114 in document 102.

Figure 27:
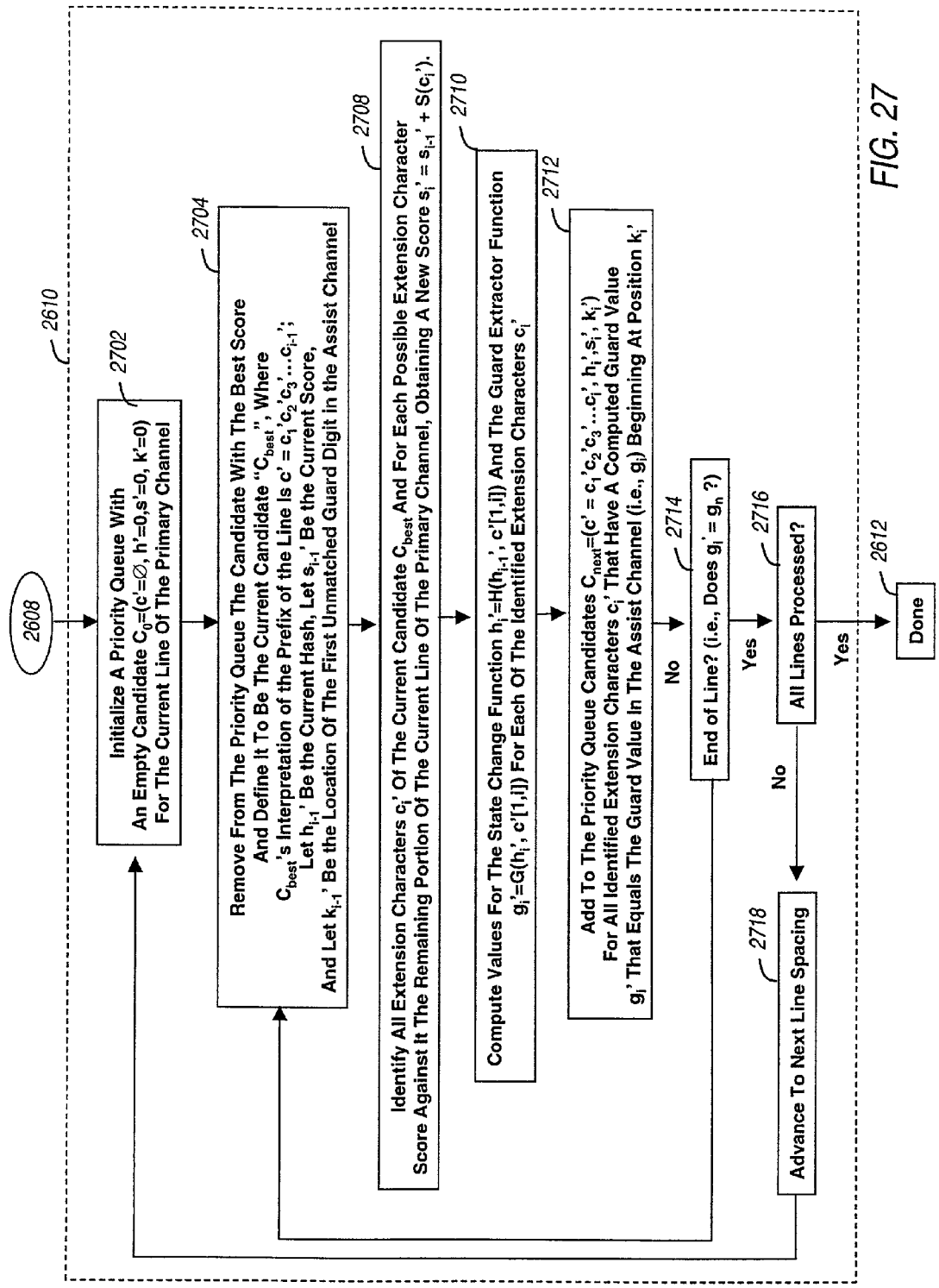
FIG. 27 is a flow diagram that sets forth the step 2610 shown in FIG. 26 in greater detail.

FIG. 27 is a flow diagram that sets forth the step 2610 shown in FIG. 26 in greater detail. At step 2702, a priority queue is initialized with an empty candidate C=(c'=Ø, h'=0, s'=0) for the current line of the primary channel, where $c' = c_1' c_2' \ldots c_{i-1}'$ is the possible interpretation of a prefix of the current line of text, h' is the value of the state change function after processing the possible interpretation c', score s' measures the quality of the possible interpretation c' of the line of the primary channel, and k' is the location of the current guard value for the current candidate.

At step 2704, the candidate with the best score is removed from the priority queue and defined as the current candidate $C_{best}$, where $C_{best}$'s interpretation of the prefix of the line is $c'=c_1'c_2' \ldots c_{i-1}'$. At step 2708, all extension characters $c_i'$ (i.e., decoded characters) of the prefix of the line $c'=c_1'c_2' \ldots c_{i-1}'$ of the current candidate $C_{best}$ are identified. In addition at step 2704, let $h_{i-1}'$ be the current hash of the candidate, $s_{i-1}'$ be the current score of the candidate, and k' be the position the first unmatched guard value in the assist channel. In addition at step 2708, each possible extension character $c_i'$ is scored against the remaining portion of the current line of the primary channel, thereby obtaining a new score $s_i'=s_{i-1}'+S(c_i')$. At step 2710, values for the state change function $h_i'=H(h_i',c_i'[1,i])$ and the guard extractor function $g_i'=G(h_i',c'[1,i])$ are computed for each of the extension characters $c_i'$ identified at step 2708.

At step 2712, each of the extension characters $c_i'$ identified at step 2708 that has a computed guard extractor function $g_i'$ computed at step 2710 that equals the guard value $g_i$ in the assist channel beginning at the position $k_i$, are added to the priority queue as candidates $C_{next}$ ($c'=c_1'c_2' \ldots c_i'$, $h_i'$, $s_i'$, $k_i$). At step 2714, if the computed guard value $g_i'$ is equal to the last guard value $g_n$ in the assist channel for the current line, then the end of the current line of the primary channel has been reached and step 2716 is executed. Otherwise, step 2704 is repeated for the next best candidate. At step 2716, if all lines in the bitmap primary channel have been processed then step 2610 advances to step 2612. Otherwise, the current line is advanced to the next line spacing at step 2716, and the step 2702 repeats.

Figure 28:
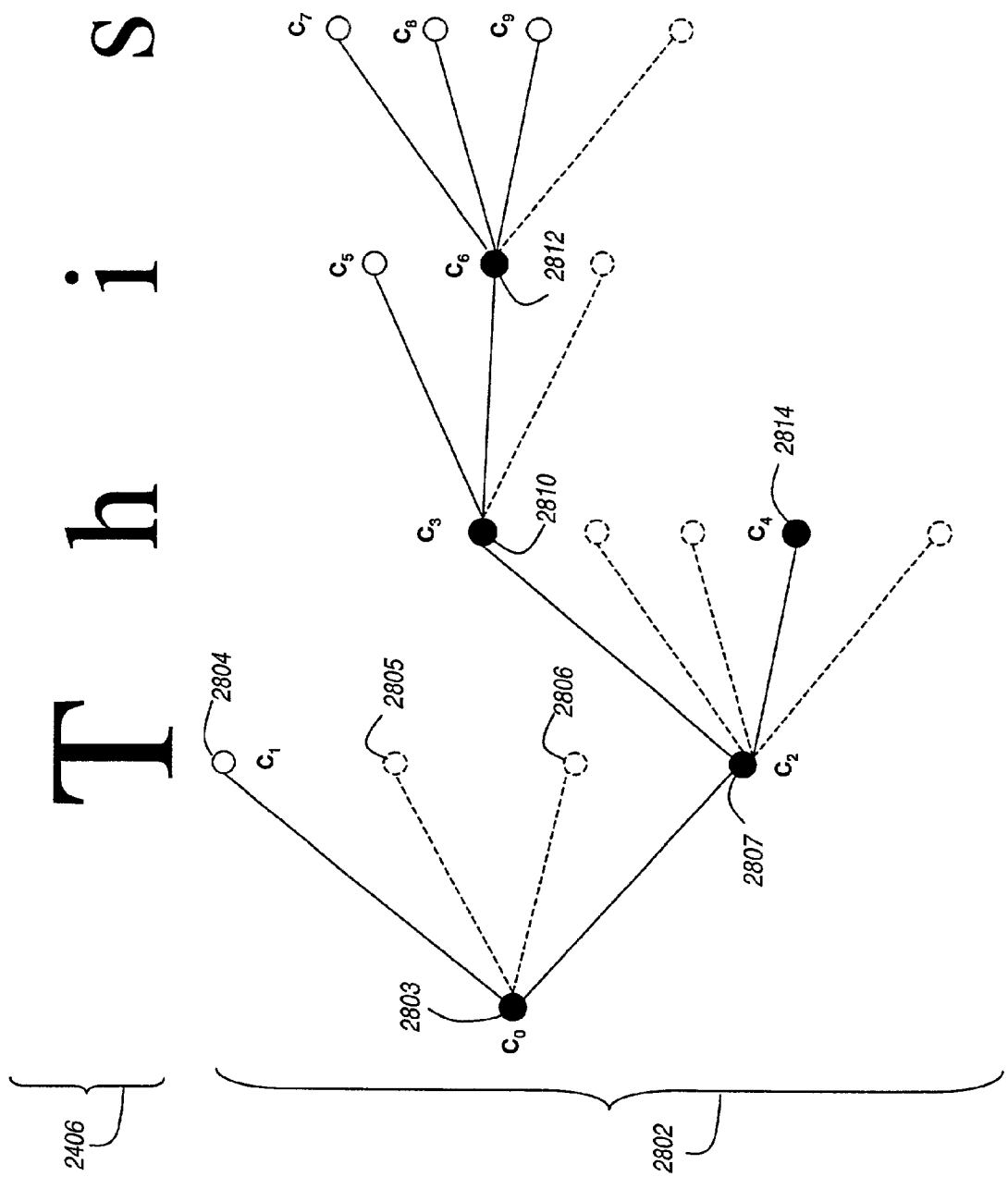
FIG. 28 illustrates a graphical representation of the method for decoding the current line of the primary channel shown in FIG. 24 according to the steps shown in FIG. 27.

FIG. 28 illustrates a graphical representation 2802 of the method for decoding the current line 2406 of the primary channel shown in FIG. 24 according to the steps shown in FIG. 27. Initially, the graph is defined by the empty candidate 2803. The extensions 2804–2807 for the first character space are identified. Note that of the extensions 2804–2807, only the extensions 2804 and 2807 are added to the priority queue because their guard values agreed with the guard value in the assist channel (i.e., $g_i'=g_i$). Subsequently, the extension 2807 is selected during the next iteration because it had the highest computed score. The bitmap of the primary channel 2406 is decoded with four iterations of the steps shown in FIG. 27. The best candidate on the priority queue selected at the start of each iteration are identified by reference number 2807, 2810, 2812, and 2814. It will be appreciated by those skilled in the art that convolution decoding techniques other than systematic decoding techniques can be used to carry out the invention such as Viterbi or list decoding techniques, as disclosed in "Fundamentals Of Convolutional Coding," by Johannesson et al., Institute of Electrical and Electronics Engineers, Inc., 1999 (ISBN: 0-7803-3483-3).

E.3 Modulated Assist Channel Convolution Coding

Figure 29:
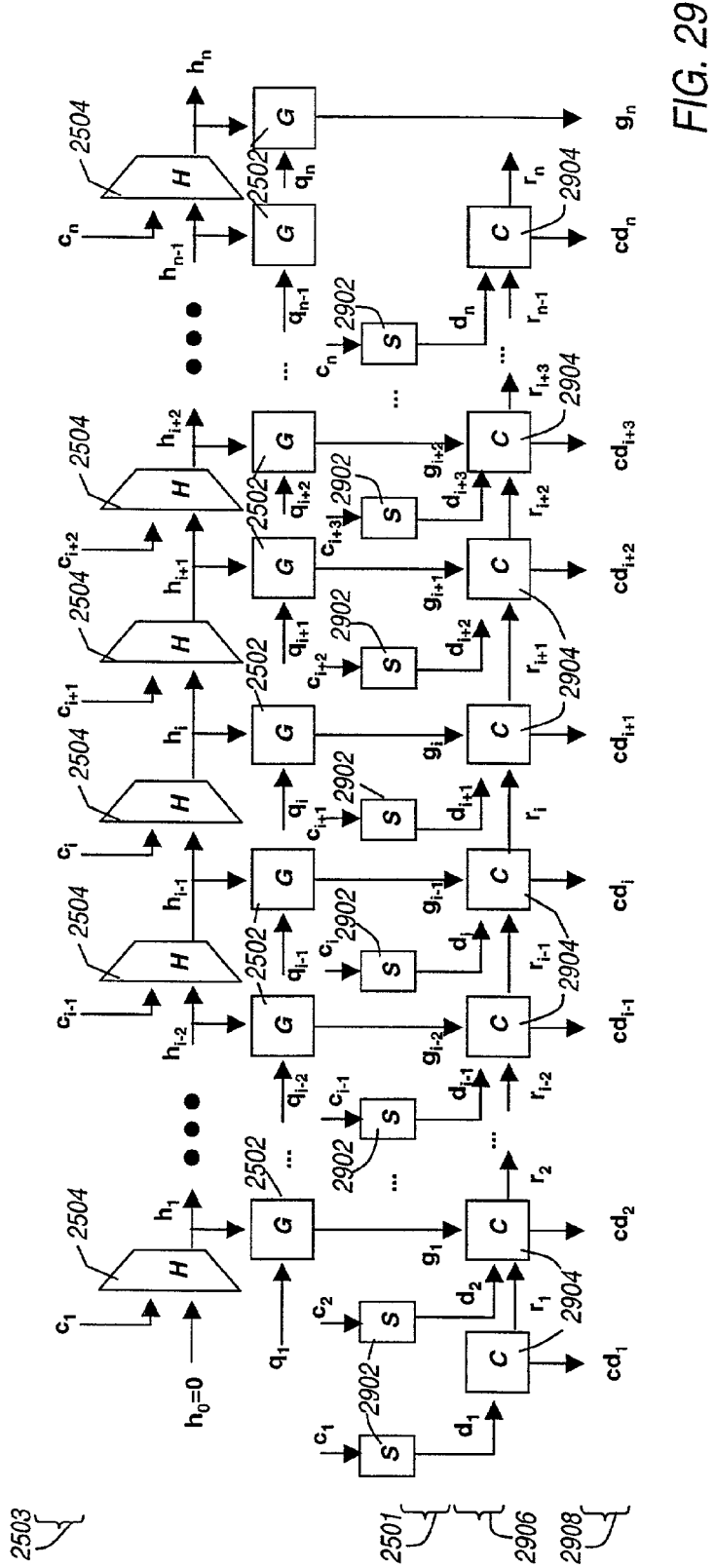
FIG. 29 illustrates the convolution coder shown in FIG. 25 with integrated separation coders and separation code compressors, which is referred to herein as "modulated convolution coding"

FIG. 29 illustrates the convolution coder shown in FIG. 25 with integrated separation coders 2902 and separation code compressors 2904, which is referred to herein as "modulated convolution coding". In this embodiment the assist channel protects symbols printed on the hardcopy document by scrambling the compression of the separation codes using guard values that are derived from a hash of the character code of each character in the primary channel. When decoding, the descrambled separation codes allow errors to be readily avoided when template match searches are performed.

Similar to the embodiment shown in FIG. 25, the state change functions 2504 and the guard extractor functions 2502 produce guard values 2501 (i.e., $g_1, \ldots g_n$). In contrast, however, the embodiment shown in FIG. 29 scrambles the production of compressed separation codes 2908 (i.e., $cd_1, \ldots cd_n$) using the guard values 2501 (i.e., $g_1, \ldots g_{n-1}$). The compressed separation codes 2908 are encoded in the assist channel along with the guard value $g_n$.

That is, similar to the convolution coding described above, state change functions 2504 are generated via the recursion of the state change function $h_i=H(h_{i-1},c_i)$. However, rather than sampling this state change function and coding the results in the assist channel, a sample of the state change function is used to modify a coding of the assist channel that is based on separation coding. The manner in which the state change function is used to modify the assist channel depends on how the separation coding is compressed.

As illustrated in FIG. 29, the character codes 2503 are input to the separation coders 2902, which produce as output the separation codes 2906. In one embodiment, the separation coders 2902 encode the character codes of the primary channel in the manner set forth in Section C above. The separation code compressors 2904 in one embodiment compress the separation codes 2906 using a modified arithmetic encoding technique, an example of which is described by Witten et al., in "Arithmetic Coding for Data Compression," Comm. ACM Vol. 30, Issue 6, pp. 520–540, 1987. In this embodiment, equivalence class labels of the separation codes are compressed with an arithmetic encoding technique that is based on the likelihood of the equivalence classes.

More specifically, encoding the extended convolution assist channel requires a first encoding and a second encoding of each line of the primary channel. A first encoding is performed for a given text string $c_1, c_2, c_3, \ldots c_n$ of the primary channel to classify the characters of the text string into equivalence classes $z_1, z_2, z_3, \ldots z_m$ (e.g., group labels a, b, c in FIG. 7) and obtain a reduced string of class labels $d_1, d_2, d_3, \ldots d_n$, where $d_i$ is one of $z_1, z_2, z_3, \ldots z_m$. An arithmetic compressor can be described as a computation on intervals: if $P(z_i)$ is the probability of the equivalence class labeled $z_i$, then the interval [0, 1) is partitioned into subintervals $[s_0,s_1), [s_1,s_2), \ldots$, where $s_i$ is the cumulative sum of the probabilities: $s_i=\Sigma_{j \leq i} P(z_j)$. This provides a width $P(z_i)$ for the $i^{th}$ subinterval that corresponds to the $i^{th}$ equivalence class. Without loss of generality, it is assumed that the intervals are ordered largest (most likely) to smallest. The string of class labels $d_1, d_2, d_3, \ldots d_n$ is compressed by the recursion:

$$r_0=[0,1), \text{ and}$$

$$r_i=S(r_{i-1}, [s_{d_i-1},s_{d_i})),$$

where S is the interval selector operator:

$$S([x, y), [a, b))=[x+a(y-x),x+b(y-x)).$$

The selection operator S selects the interval [x',y') within the current interval [x,y) in the same proportion that the interval for $d_i$'s equivalence class $[s_{d_i-1},s_{d_i})$ corresponds to the interval [0,1). In this way the interval $r_i$ uniquely determines the string of class labels $d_1, d_2, d_3, \ldots d_n$, and requires the ceiling of $(\log(P(d_1)P(d_2)P(d_3) \ldots P(d_i)+1$ bits to be specified.

A second encoding is performed for the given text string $c_1, c_2, c_3, \ldots c_n$, of the primary channel to compute the corresponding state change functions $h_1, h_2, h_3, \ldots h_n$. In one embodiment, $h_i$ is sampled with a binary valued function G, such that it is equally likely that $G(h_i)$ equals zero or one. Subsequently, as shown in FIG. 29, the output of the state change function are used to modify the arithmetic encoders 2904 by permuting the selection intervals. For a partition of [0,1) into subintervals $[s_0,s_1)$, $[s_1,s_2)$, . . . , a permutation $\mu$ is defined such that $[\mu(s_0), \mu(s_1))$, $[\mu(s_1), \mu(s_2))$, $[\mu(s_2), \mu(s_3))$, . . . , is also a partition that covers $[0,1)$, and the interval length is preserved as: $\|\mu(s_{i+1})-\mu(s_i)\|=\|s_{i+1}-s_i\|$. A permutation operator is defined to depend on a single bit, which is supplied by the state change function, as follows:

$$R(g, [a, b)) = \begin{cases} [a, b) & g = 0 \\ [\mu(a), \mu(b)) & g = 1 \end{cases}$$

The permutation $\mu$ is chosen to provide as large a desynchronization as possible. When the first interval is greater than ½, the reversal permutation $\mu(x)=1-x$ is sufficient. When the largest interval is less than ½ it is desirable to choose a permutation such that no interval overlaps itself in the image of the permutation. With the operator $R(g,[a,b))$, the arithmetic compression recursion may be rewritten as:

$$r_0=[0,1)$$

$$r_i=S(r_{i-1},R(G(h_{i-1}),[s_{d_i-1},s_{d_i}))$$

Figure 30:
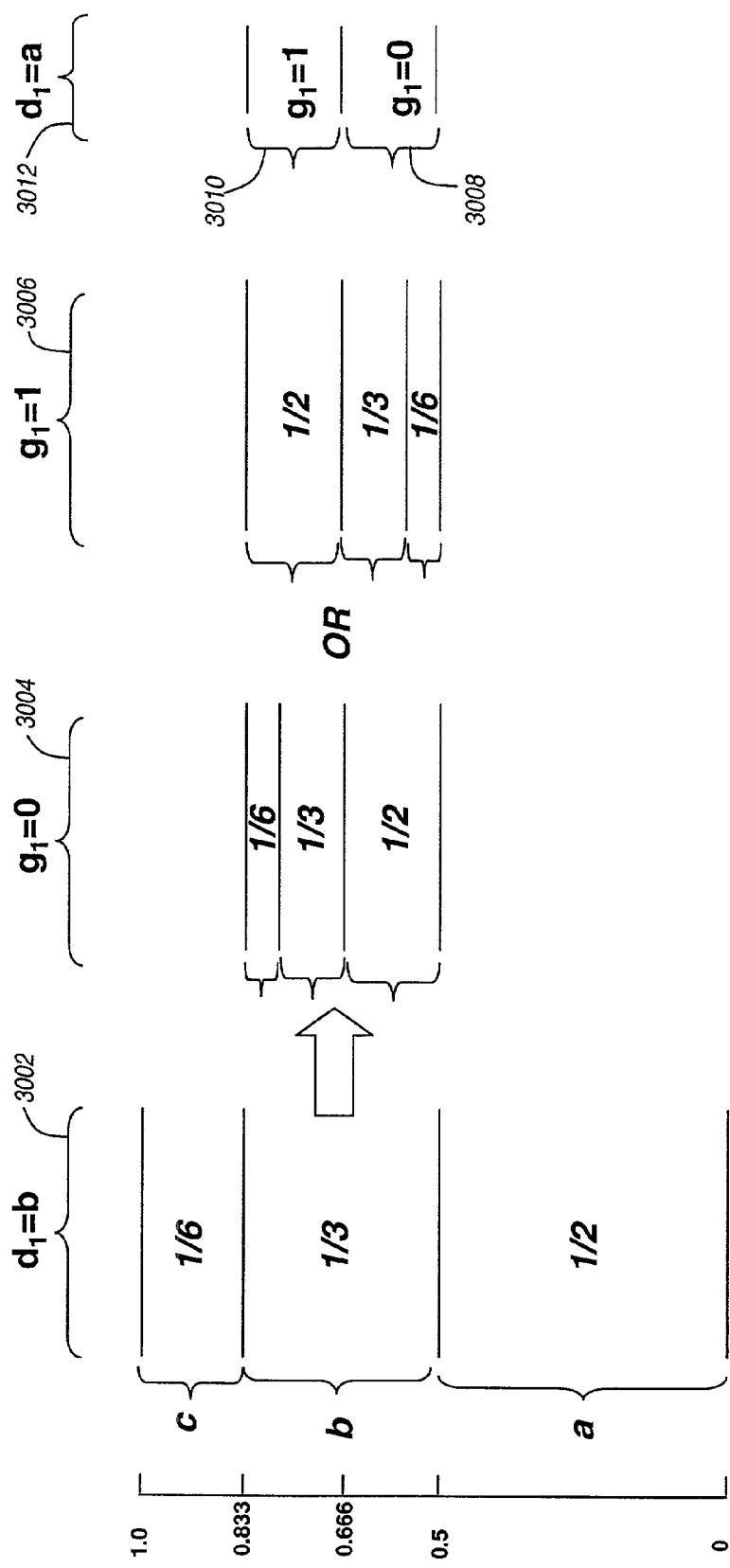
FIG. 30 illustrates an example of the scrambling of separation codes that are compressed with arithmetic encoding using the guard values.

FIG. 30 illustrates an example of the scrambling the compression 2904 of the separation codes 2906 using the guard values 2501. In FIG. 30, a string of separation code (or class) labels "a", "b", and "c" are encoded with real numbers between zero and one. The assigned probabilities for each of the class labels a, b, and c is in the proportion ½ to ⅓ to ⅙ to define intervals 3002 (i.e., 0 to 0.5, 0.5 to 0.833, 0.833 to 1.0). This example shown in FIG. 30 assumes that the string of class labels being encoded begins with a "b" and follows with an "a". Beginning with the "b" class label, the selected interval is [0.5,0.833). The subsequent interval is selected from either intervals 3004 or intervals 3006. These intervals are flipped depending on whether the computed single-bit guard value $g_1$ is equal to one or zero. Following with the "a" separation code, the subsequent interval is defined by the range of values 3008 or 3010 depending on whether the guard value $g_1$ equals zero or one, respectively, at 3012, thereby scrambling the compression of the separation code, based on the guard value.

Figure 31:
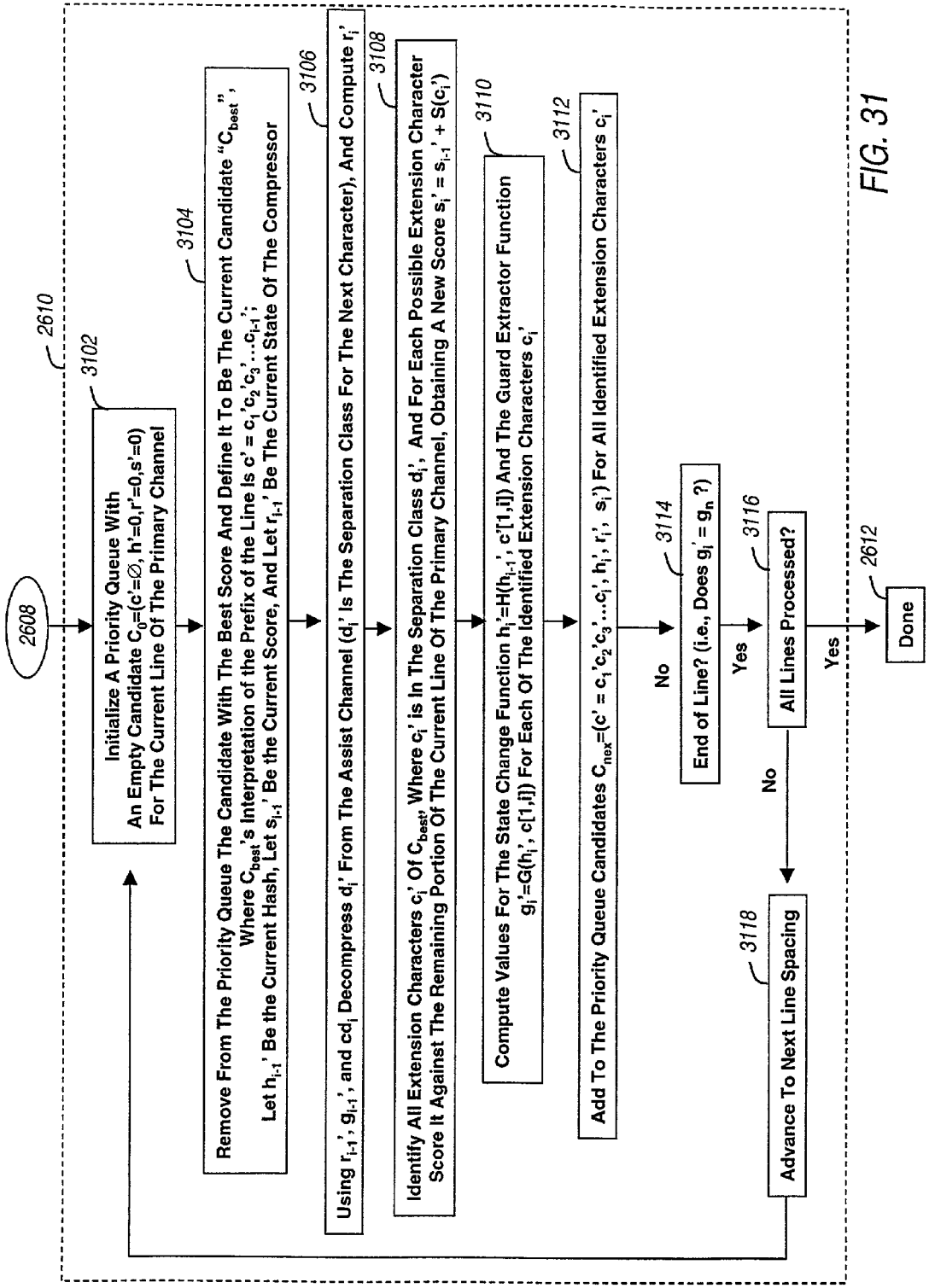
FIG. 31 is a flow diagram that sets forth the details of step 2610 shown in FIG. 26 for decoding each line of the primary channel with a scrambled convolution coded assist channel.

FIG. 31 is a flow diagram that sets forth the details of step 2610 shown in FIG. 26 for decoding each line of the primary channel with a scrambled convolution coded assist channel. Similar to step 2702 shown in FIG. 27, step 3102 initializes a priority queue with an empty candidate $C_0$. Subsequently at step 3104, the candidate, defined as $C_{best}$, is removed from the priority queue similar to step 2704, except that the current state of the compressors 2904 is recorded as $r_{i-1}'$. At step 3106, the separation code label $d_i'$ is decompressed using the compressed separation code label $cd_i$ from the assist channel, the previous state of the compressor $r_{i-1}$, and the previous guard value $g_{i-1}$. The separation code label $d_i'$ is the computed separation class for the next extension character of the prefix of the line c'.

At step 3108, all extension characters $c_i'$ of $C_{best}$ are identified, where $c_i'$ is in the computed separation class labeled $d_i$. In addition at step 3108, each possible extension character $c_i'$ that is identified is scored against the remaining portion of the current line of the primary channel, thereby obtaining a new score $s_i'=s_{i-1}'+S(c_i')$. Finally at step 3112, the candidates $C_{next}$ for all identified extensions $c_i'$ are added to the priority queue. Note that steps 3114, 3116, and 3118 correspond to steps 2714, 2716, and 2718 shown in FIG. 27 and described above.

Thus, unlike the decoding technique shown in FIG. 27, which eliminates from the priority queue those candidates whose computed guard values do not match the guard values in the assist channel, the decoding technique in FIG. 31 eliminates candidates that are not in the correct separation class. However, the algorithms of FIGS. 27 and 31 are similar in that decoding errors in a particular candidate will cause all extensions of that candidate to score poorly. In FIG. 31, after an error in the candidate, the separation class $d_i$ decompressed at step 3106 will be more nearly random, rather than correct, so there will be a significant probability the best extension will not be explored in step 3108, and consequently lowering the score of extensions of a candidate containing an error.

It will be appreciated by those skilled in the art that it is possible to link the computation of the state change function with a variety of compression algorithms. The general idea is behind this approach is to have the values of the state change function modify the functioning of the compression algorithm in a way that does not affect the quality of the compression achieved, but scrambles the results of the decompression after an error occurs. For example, a Ziv-Lempel-Welch compressor could be modified to scramble compression by XORing a subset of the bits of the state change function $h_{i-1}$ with the compressor's dictionary index before coding.

F. Alternate Operating Environment Using A Rewrite Model

In the operating environment set forth in Section A, the shortest path of the DID-style decoder is modified to account for the information in the assist channel. In this manner, the decoder is modified to find the shortest path by identifying matching solutions that are consistent with the information in the assist channel. That is, the shortest path computations performed in the operating environment of the decoder shown in FIG. 2 can be incrementally applied to find the shortest path that is consistent with decoding errors corrected by the assist channel.

Figure 32:
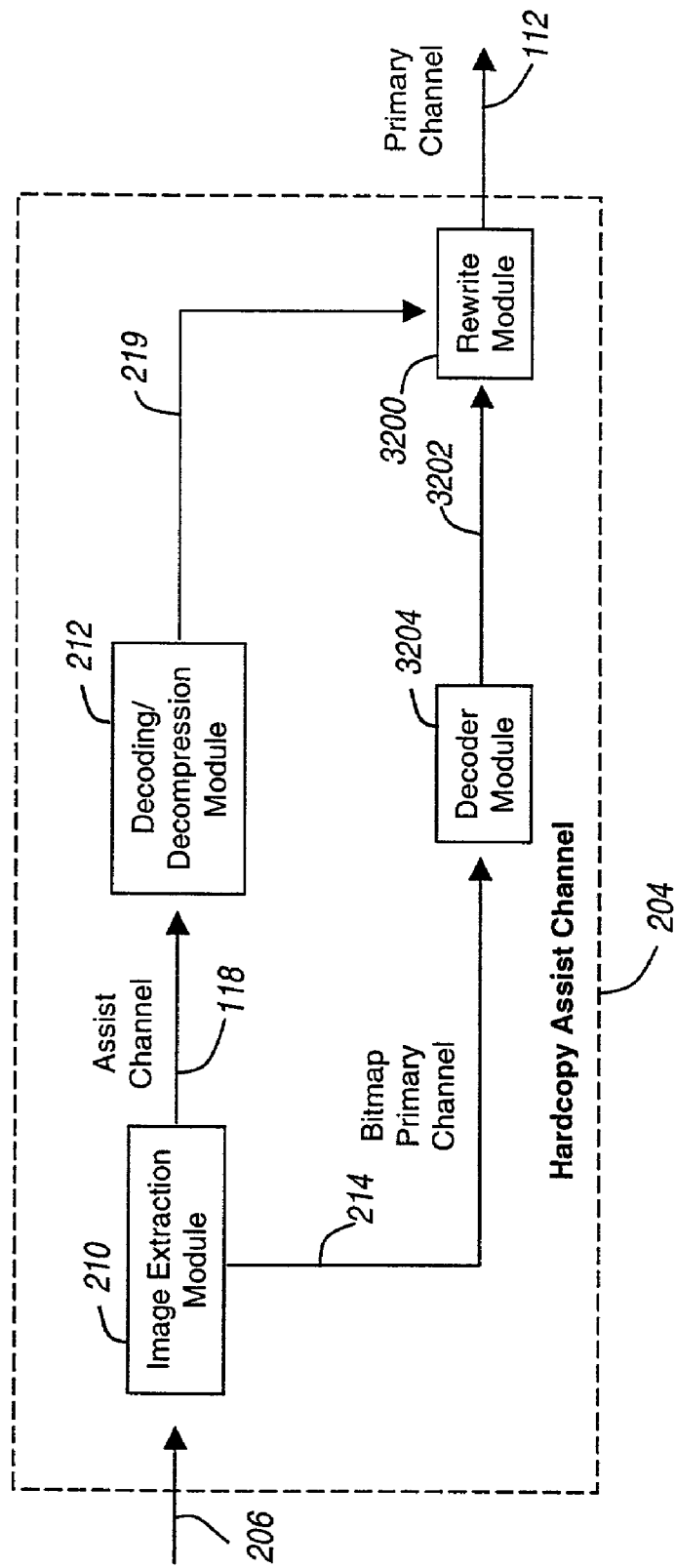
FIG. 32 illustrates an alternate embodiment of the hardcopy assist channel shown in FIG. 2.

FIG. 32 illustrates an alternate embodiment of the hardcopy assist channel 204 shown in FIG. 2. In this alternate embodiment, the assist channel operates independent of the decoder module 3204. Thus, in this alternate embodiment, the assist channel need not be integrated with any particular OCR decoding process. Instead, an assist channel is input to a rewrite module that models decoder errors independent from any OCR engine that performs the initial decoding of a bitmap image.

Similar to the embodiment shown in FIG. 2, the image extraction module 210 in FIG. 32 receives bitmap image data 206 and separates the assist channel 118 data from bitmap primary channel 214 data. However, in this embodiment, the decoder module 3204 decodes the bitmap primary data 214 without support from the decoded and decompressed assist channel 219 to produce candidate primary data 3202. Also in this embodiment, a rewrite module 3200 takes as input the candidate primary data 3202 and the decoded and decompressed assist channel 219 to produce the primary channel of data 112.

Figure 33:
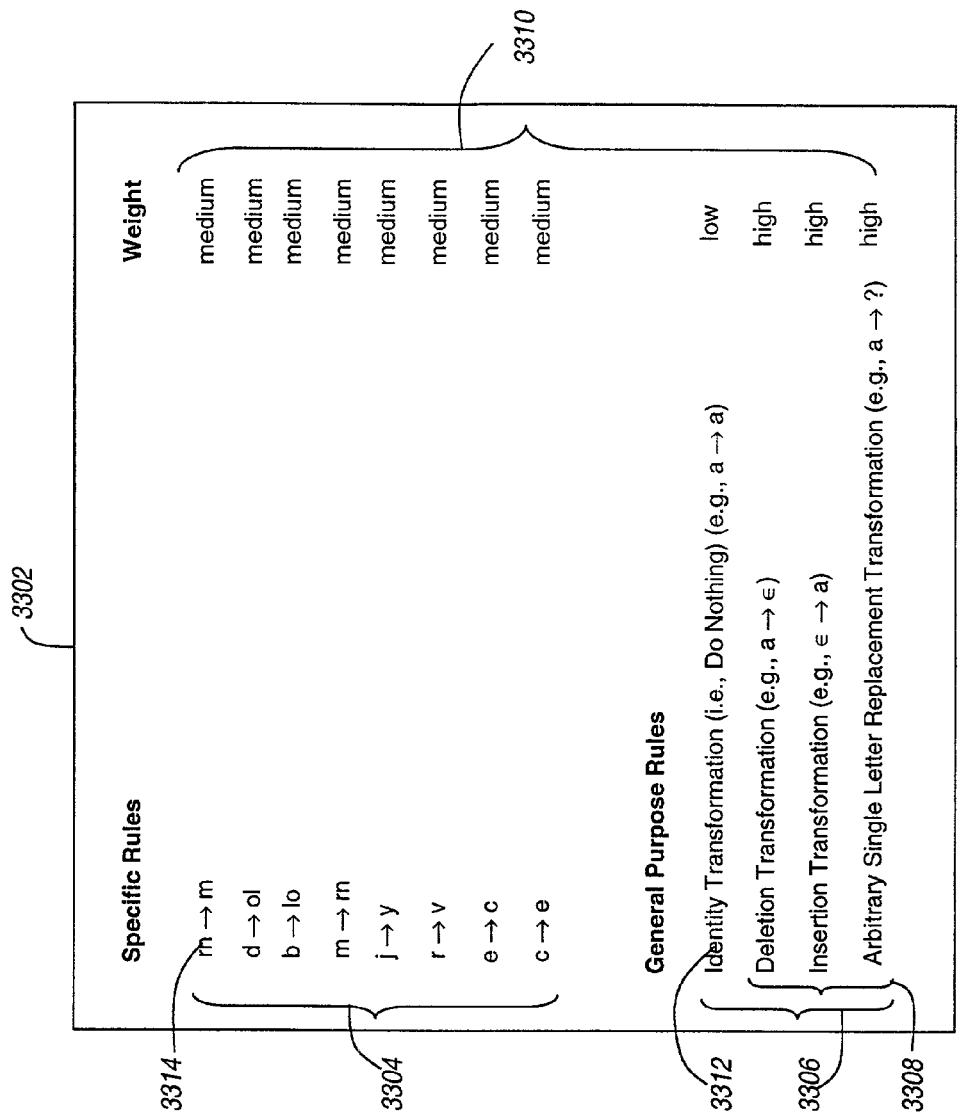
FIG. 33 illustrates an event library that is used to build a failure model for the OCR engine in the decoder module.

In operation, the rewrite module 3200 defines a graph of the candidate primary data 3202 using an event library. The event library is used to build a failure model for the OCR engine in the decoder module 3204 by measuring the probability of various failure events that may occur during OCR processing. These failure events may be general (i.e., have a tendency to occur in all OCR engines) or specific (i.e., have a tendency to occur only in certain OCR engines). For example, FIG. 33 illustrates an event library 3302 that sets forth specific rules 3304 and more general purpose rules 3306, which include catchall rules 3308. Weights 3310 are assigned to each rule. The lower the weight the more likely that event will occur in the decoder module. Consequently, the identity transform 3312 (i.e., the do nothing transform) may have the lowest or one of the lowest assigned weights. One example of a failure event is event 3314 (i.e., m→m), which defines a corrupted occurrence (i.e., "rn") and its correction (i.e., "m").

In one embodiment, the failure model is a weighted finite state transducer with a simple structure that includes a single state with a transition returning to that state. Because of the simplicity of the weighted finite state transducers in this embodiment, it is not necessary to treat the failure model with the fully generalized formulation of a weighted finite state transducer. In an alternate embodiment, a more generalized formulation of a weighted finite state transducer that incorporates a language model, as described by Jones et al. in "Integrating Multiple Knowledge Sources in A Bayesian OCR Post-Processor", Proc. of ICDAR 91 Saint-Malo, France, Volume 2, pp. 925–933, which is incorporated herein by reference, is employed. This more generalized formulation of a weighted finite state transducer accounts for the rewrite module's inability to access any language model built into the OCR engine of the decoder module.

With the failure model defined in the event library 3302, the rewrite module 3200 rewrites the candidate primary data 3202 decoded by decoder module 3204 with the assistance of the assist channel 219. In one embodiment, rewriting is performed by computing the shortest path (using dynamic programming using a Viterbi algorithm) of the candidate primary data 3202 using the failure model and the assist channel. This rewrite operation finds the most likely primary channel data 112. In other words, this shortest path computation provides a surrogate for the shortest path computation in the DID OCR engine operating in the decoder module 216 discussed above, thereby allowing the assist channel to be applied to any OCR engine that may operate in the decoder module 3204.

As set forth above with reference to FIG. 12, computation of the shortest path includes steps for defining a graph and steps for computing the shortest path. In this embodiment of the DID OCR engine, the steps for defining a graph are set forth in FIG. 34 at reference number 3400. Once a graph is defined using steps 3400, the shortest path of the graph is computed using steps 1201 shown in FIG. 12, which are discussed in detail above.

Figure 34:
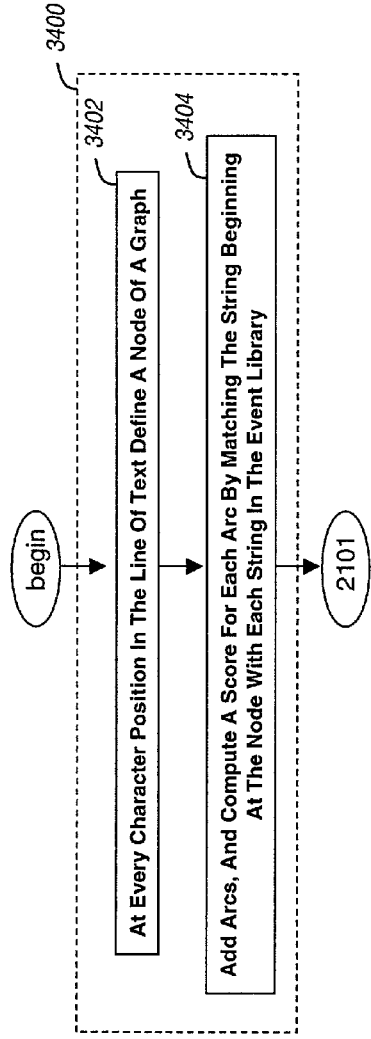
FIG. 34 is a flow diagram that sets forth the steps for defining a graph performed by the rewrite module shown in FIG. 32 using the event library shown in FIG. 33.

The steps 3400 shown in FIG. 34 for defining a graph include step 3402 that defines a node in the graph at every character (or symbol) position in a line of text from the candidate primary data 3202. In other words, nodes in the graph correspond to each text position in the candidate primary data. At step 3404, each node the event library 3302 is searched and when the left hand side of an event matches the string beginning at the node (i.e., the current node), an arc is added. The score of the arc is the weight of the event. The destination node of the arc has a position equal to the position of the current node plus the number of characters in the left hand side of the matched event.

Figure 35:
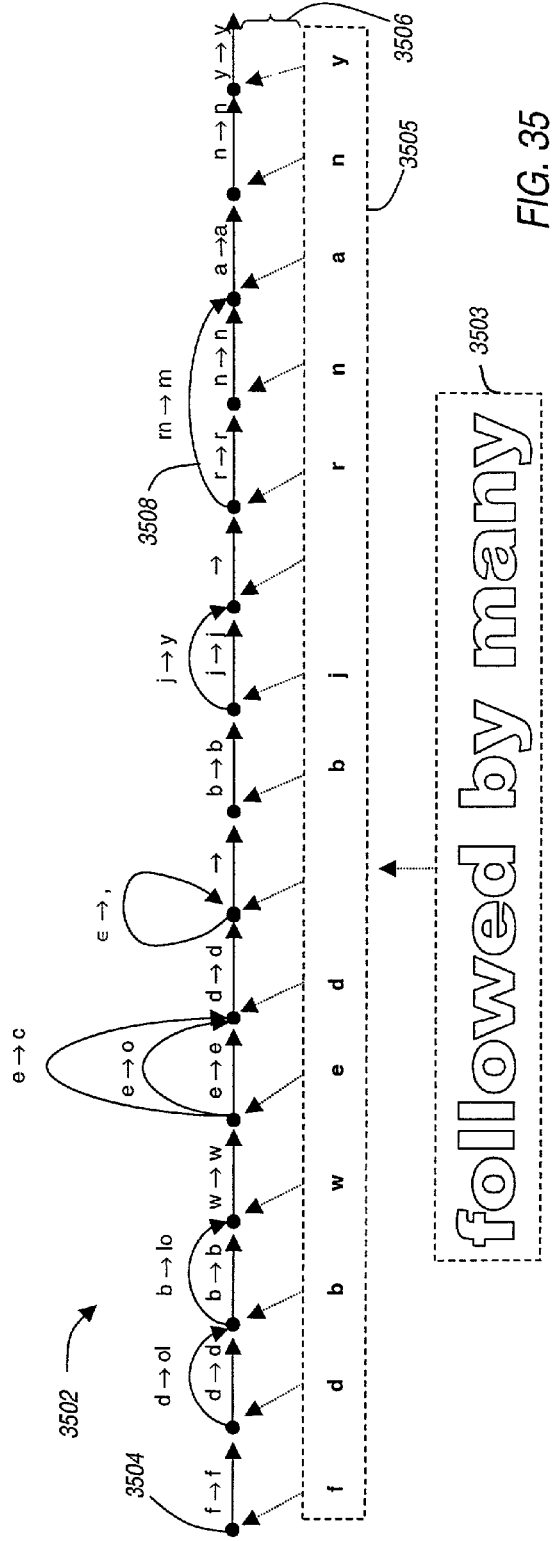
FIG. 35 illustrates an example of a graph defined in accordance with the steps set forth in FIG. 34.

FIG. 35 illustrates an example of a graph defined in accordance with the steps set forth in FIG. 34. The candidate OCR interpretation 3505 is computed using for example a DID OCR engine from an extracted bitmap primary channel 3503. At every character position 3506 in the candidate OCR interpretation 3505, a node 3504 in the graph 3502 is defined (step 3402). Arcs are drawn between the nodes in the graph and assigned a rewrite and a score when the string defined by the character positions beginning at a node matches a string in the event library. For example, the arc 3508 is given a score and a rewrite (i.e., "m") for the match between the string of characters "rn" in the candidate OCR interpretation 3505 and the string 3314 in the event library 3302 (step 3404). Note that the shortest arcs in the graph 3502 are the identity transformation 3312 defined in the event library.

In an alternate embodiment, the decoder module 3204 includes with the candidate primary data 3202 delivered to the rewrite module 3200 other OCR data such as certainty estimates. In one embodiment, these certainty estimates are incorporated into the arc score at step 3404. Thus, although the decoder module 3204 and the rewrite module 3200 operate independent of each other, the rewrite module 3200 may take advantage of other statistical information that may be provided by the decoder module 3204.

Figure 36:
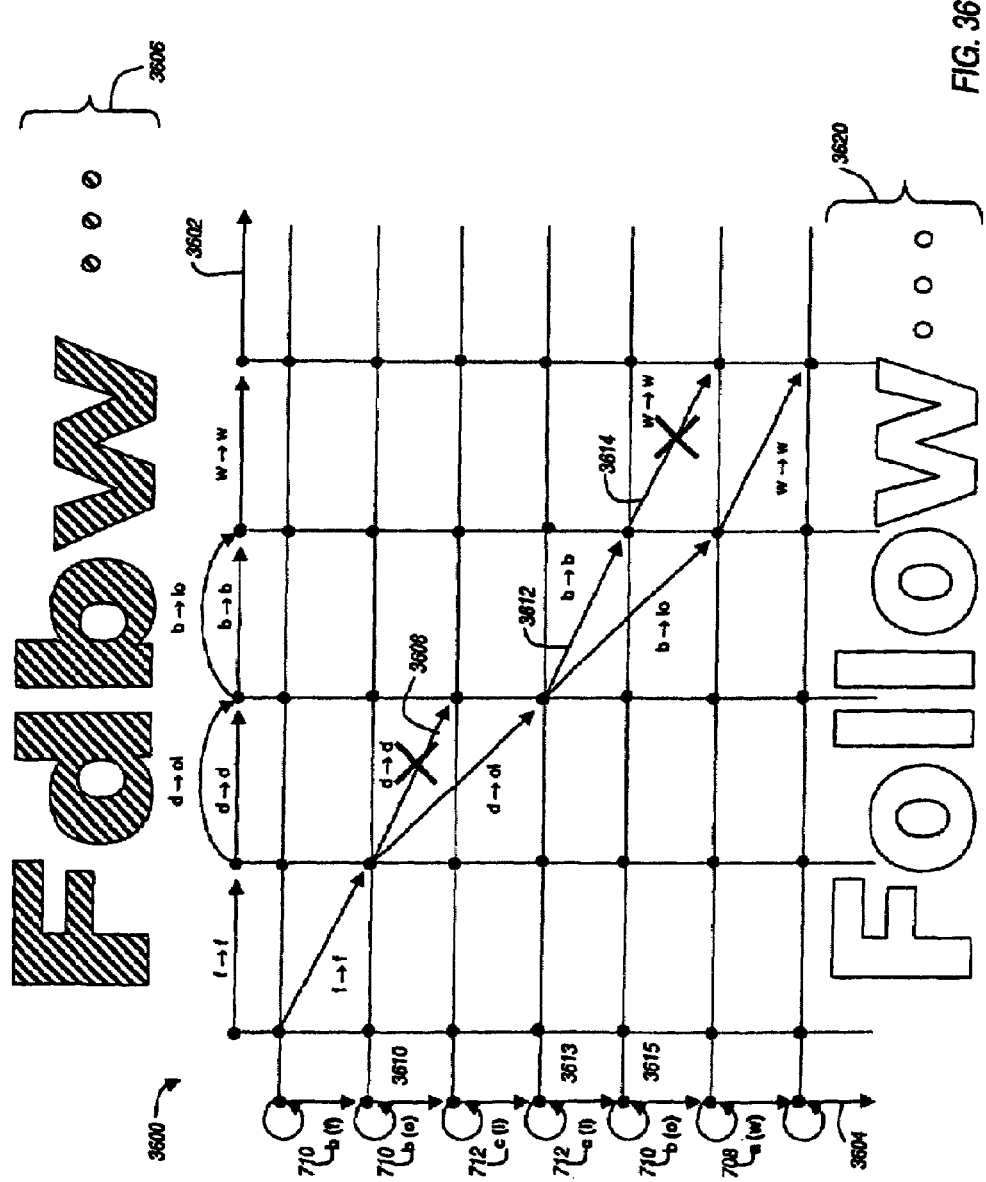
FIG. 36 illustrates an example of the decoding of the graph defined with the steps 1201 set forth in FIG. 12.

FIG. 36 illustrates decoding of the graph defined in FIG. 35 with the steps 1201 set forth in FIGS. 11 and 12. In the example shown in FIG. 36, a product graph 3600 is defined in a similar manner to the product graph defined in FIG. 16. The steps set forth in FIG. 11 for decoding a primary channel using an assist channel encoded using separation codes can be applied to rewrite the candidate OCR interpretation, except that each line of the primary channel acquired at step 1110 corresponds to a line in the OCR interpretation 3505 and not the bitmap primary channel 214.

For illustrative purposes the example of the decoding of the graph defined in FIG. 36 sets forth only the first four symbols of FIG. 35. Also, for simplicity only a few arcs are shown in FIG. 36 to illustrate how the product graph 3600 is formed. In accordance with separation decoding described in detail above, a first dimension 3602 of the product graph 3600 is defined. It will be appreciated by those skilled in the art that the rewrite module 3200 does not perform a shortest path computation of the graph in the first dimension 3602, but rather a shortest path computation in the product graph.

As shown in FIG. 36, the output of the unassisted decoded primary channel 3606 (i.e., candidate primary data 3202—characters "Fdbw") is corrected using the assist channel in the product graph 3600 to produce corrected output 3620 (i.e., primary channel data 112—characters "Follow"). In defining the product graph, the rewrite module 3200 identifies both a character position in the candidate OCR interpretation 3602 and a position in the corresponding assist channel 3604. The example assist channel shown in FIG. 36 is defined using separation codes arranged in the three groups shown in FIG. 7. In defining the product graph 3600, arc 3608 is excluded from the product graph because the character "d" falls in the separation group "a" and not the separation group "b" as required by the second position of the assist channel at arc 3610. However, note that although the arc 3612 satisfies the fourth position 3613 of the assist channel, the subsequent arc 3614 does not satisfy the fifth position 3615 of the assist channel. Once the product graph 3600 is defined, computing the shortest path of the product graph produces the output string 3620, which includes characters "Follow".

It will be appreciated by those skilled in the art that the rewrite module need not be limited to operate using separation coding as shown in FIG. 36. Instead, the rewrite module may operate in accordance with block coding and convolution coding as discussed above with reference to the operating environment shown FIG. 2. Also, those skilled in the art will appreciate that the same manner in which convolutional coding performed by the decoder module 216 shown in FIG. 2 modifies a graph (e.g., the graph 1602 shown in FIG. 16) into a tree (e.g., the tree 2802 shown in FIG. 28), the rewrite module 3200 shown in FIG. 32 operating with a convolutional rewrite module would modify the graph 3602 shown in FIG. 36 into a tree.

It will be further appreciated by those skilled in the art that the rewrites of the candidate primary data by the rewrite module are likely to be meaningless (i.e., the identity transform) unless the rewrite operations are performed with the assistance of the assist channel, since the character or symbol in the primary channel decoded by decoder 3204 should be more likely than any other event identified by the failure model. As a result, the failure model becomes useful when the assist channel has restricted or corrected the characters appearing in the candidate primary data with the next best interpretation. Such restriction or correction of the candidate primary data may involve resynchronization of the data as shown in FIG. 36 that are implied by the failures identified by the rewrite module (e.g., m→m).

In summary, the more generalized hardcopy assist channel shown in FIG. 32, which includes a rewrite module that uses the assist channel to correct OCR failures independent of the decoder module, may be less efficient than the integrated hardcopy assist channel shown in FIG. 2. Inefficiencies arise in the generalized hardcopy assist channel because not all of the statistical information used by the OCR decoder will be known to the rewrite module. That is, the DID OCR engine that is integrated with an assist channel in FIG. 2 is able to use more statistical information about alternative interpretations that are specific to the bitmap primary channel being decoded. In contrast, the rewrite module shown in FIG. 32 has only available to it in the failure model statistical information of OCR failures that occur to any document in general. However, the primary advantage of the generalized hardcopy assist channel shown in FIG. 32 is that any of the assist channel decoding techniques (i.e., separation coding, block coding, or convolution coding) can operate in the rewrite module independent of the OCR engine selected to operate in the decoder module. It will be appreciated by those skilled in the art that other OCR engines that can operate in the decoder module besides the DID OCR engine discussed above, include the OCR engine in TextBridge Pro Millennium produced by ScanSoft, Inc. (www.scansoft.com).

G. Miscellaneous

It will be appreciated that portions of the system embodying the present invention may be readily implemented in software using software development environments that provide source code that can be used on a variety of hardware platforms. Alternatively, portions of the system may be implemented partially or fully in hardware using standard logic circuits. Whether software or hardware is used to implement different portions of the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The invention claimed is:

1. A method for decoding image data for a hardcopy document, comprising:
   recording a scanned representation of the hardcopy document that includes a primary set of symbol data and a secondary set of encoding data; the primary set of symbol data providing a first channel of human readable information rendered on the hardcopy document; the secondary set of encoding data providing a second channel of machine readable information rendered on the hardcopy document;
   receiving a decoded form of the scanned representation of the hardcopy document from a decoding module to define a candidate set of symbol data; and
   rewriting, independent of the decoding module, the candidate set of symbol data using an event library and the secondary set of encoding data; and computing a shortest path of a product graph of the candidate set of symbol data and the secondary set of encoding data; the event library identifying likely failures encountered when the scanned representation of the hardcopy document is decoded; the event library comprising a rule that represents a transformation.

2. The method according to claim 1, wherein said computing is performed using a shortest path computation.

3. The method according to claim 2, wherein the shortest path computation comprises a two-pass dynamic programming computation.

4. The method according to claim 1, wherein the product graph is defined by:
   defining nodes that correspond to both position in the candidate set of symbol data and the secondary set of encoding data; and
   defining arcs that satisfy the candidate set of symbol data and the secondary set of encoding data.

5. The method according to claim 4, wherein the product graph is further defined by matching symbols in the candidate set of symbol data with events from the event library.

6. The method according to claim 1, wherein the decoding module performs dynamic programming to decode the scanned representation of the hardcopy document.

7. The method according to claim 1, wherein the secondary set of encoding data is encoded using one of separation coding, block coding, and convolution coding.

8. The method according to claim 1, wherein the decoded form of the scanned representation includes certainty estimates of the candidate set of symbol data.

9. An apparatus for decoding image data for a hardcopy document, comprising:
   means for recording a scanned representation of the hardcopy document that includes a primary set of symbol data and a secondary set of encoding data; the primary set of symbol data providing a first channel of human readable information rendered on the hardcopy document; the secondary set of encoding data providing a second channel of machine readable information rendered on the hardcopy document;
   means for receiving a decoded form of the scanned representation of the hardcopy document from a decoding module to define a candidate set of symbol data; and
   means for rewriting, independent of the decoding module, the candidate set of symbol data using an event library and the secondary set of encoding data; and computing a shortest path of a product graph of the candidate set of symbol data and the secondary set of encoding data; the event library identifying likely failures encountered when the scanned representation of the hardcopy document is decoded; the event library comprising a rule that represents a transformation.

10. An apparatus for decoding image data for a hardcopy document, comprising:
- a scanner for recording a scanned representation of the hardcopy document that includes a primary set of symbol data and a secondary set of encoding data; the primary set of symbol data providing a first channel of human readable information rendered on the hardcopy document; the secondary set of encoding data providing a second channel of machine readable information rendered on the hardcopy document;
- a decoding module coupled to the scanner for providing a decoded form of the scanned representation of the hardcopy document to define a candidate set of symbol data; and
- a rewrite module for rewriting, independent of the decoding module, the candidate set of symbol data using an event library and the secondary set of encoding data; and computing a shortest path of a product graph of the candidate set of symbol data and the secondary set of encoding data; the event library identifying likely failures encountered when the scanned representation of the hardcopy document is decoded; the event library comprising a rule that represents a transformation.

11. The apparatus according to claim 10, further comprising a module for decoding the secondary set of encoding data for use by the rewrite module.

12. The apparatus according to claim 10, further comprising a module for decoding and decompressing the secondary set of encoding data for use by the rewrite module.

13. The apparatus according to claim 10, wherein said computing means performs a shortest path computation that includes a two-pass dynamic programming computation.

14. The apparatus according to claim 10, wherein the product graph is defined by:
- nodes that correspond to both position in the candidate set of symbol data and the secondary set of encoding data; and
- arcs that satisfy the candidate set of symbol data and the secondary set of encoding data.

15. The apparatus according to claim 14, wherein the product graph is further defined by symbols in the candidate set of symbol data that are matched with events from the event library.

16. The apparatus according to claim 10, wherein the rewrite module performs dynamic programming to decode the scanned representation of the hardcopy document.

17. The apparatus according to claim 10, wherein the secondary set of encoding data is encoded using one of separation coding, block coding, and convolution coding.

18. The apparatus according to claim 10, wherein the decoded form of the scanned representation includes certainty estimates of the candidate set of symbol data.

* * * * *